US012808823B2

(12) United States Patent
Tanaka

(10) Patent No.: US 12,808,823 B2
(45) Date of Patent: Nov. 24, 2026

(54) IMAGE PROCESSING APPARATUS, PROCESSING SYSTEM, IMAGE DISPLAY METHOD, AND PROGRAM

(71) Applicant: FUJIFILM Corporation, Tokyo (JP)

(72) Inventor: Eiichi Tanaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 174 days.

(21) Appl. No.: 18/620,548

(22) Filed: Mar. 28, 2024

(65) Prior Publication Data

US 2024/0242330 A1 Jul. 18, 2024

Related U.S. Application Data

(63) Continuation of application No. PCT/JP2022/030413, filed on Aug. 9, 2022.

(30) Foreign Application Priority Data

Sep. 30, 2021 (JP) ............................ JP2021-161061

(51) Int. Cl.
*G01N 23/18* (2018.01)
*G06T 3/40* (2006.01)
(Continued)

(52) U.S. Cl.
CPC ............... *G01N 23/18* (2013.01); *G06T 3/40* (2013.01); *G06T 7/0004* (2013.01); *G06T 11/26* (2026.01);
(Continued)

(58) Field of Classification Search
CPC ......... G06T 7/0004; G06T 11/60; G06T 3/40; G06T 2207/10024; G06T 2200/24;
(Continued)

(56) References Cited

U.S. PATENT DOCUMENTS 9,412,054 B1 * 8/2016 Krupnik ................. A61B 1/041
10,709,351 B2 7/2020 Liu et al.
(Continued)

FOREIGN PATENT DOCUMENTS

CN 111407317 A 7/2020
CN 111414124 A 7/2020
(Continued)

OTHER PUBLICATIONS

The extended European search report issued by the European Patent Office on Dec. 18, 2024, which corresponds to European Patent Application No. 22875602.9-1207 and is related to U.S. Appl. No. 18/620,548.
(Continued)

*Primary Examiner* — Phi Hoang
(74) *Attorney, Agent, or Firm* — Studebaker Brackett PLLC

(57) ABSTRACT

Provided are an image processing apparatus, a processing system, an image display method, and a program capable of securing good visibility of a defect in a processing target. A processing target image (IMG) generated by imaging a processing target is acquired, the processing target image is displayed on a first region (70) of a first display device (34), a region-of-interest image (IMGD) in which a region-of-interest (DA) in the processing target image is reproduced is acquired, the region-of-interest image is displayed on a second region (72) different from the first region of the first display device, or the region-of-interest image on a second display device different from the first display device, and one of the processing target image or the region-of-interest image is operated in conjunction with an operation on the other.

26 Claims, 19 Drawing Sheets

(51) Int. Cl.

| | |
|---|---|
| ***G06T 7/00*** | (2017.01) |
| ***G06T 11/26*** | (2026.01) |
| ***G06T 11/60*** | (2026.01) |

(52) U.S. Cl.

CPC .......... *G06T 11/60* (2013.01); *G06T 2200/24* (2013.01); *G06T 2207/10024* (2013.01); *G06T 2207/20081* (2013.01); *G06T 2207/20092* (2013.01); *G06T 2207/30108* (2013.01)

(58) Field of Classification Search

CPC ........... G06T 11/26; G06T 2207/20081; G06T 2207/30108; G06T 2207/20092; G01N 21/8851; G01N 23/04; G01N 23/18

See application file for complete search history.

(56) References Cited

U.S. PATENT DOCUMENTS

| | | | | |
|---|---|---|---|---|
| 2007/0194231 | A1 | 8/2007 | Nakahira et al. | |
| 2014/0347389 | A1 | 11/2014 | Kobayashi et al. | |
| 2017/0119352 | A1 | 5/2017 | Anand | |
| 2018/0052120 | A1* | 2/2018 | Murakami | G01N 23/04 |
| 2018/0247343 | A1* | 8/2018 | Higashi | G06F 3/0488 |
| 2018/0299388 | A1 | 10/2018 | Kaneko | |
| 2018/0299389 | A1 | 10/2018 | Kaneko | |
| 2018/0310905 | A1* | 11/2018 | Yoshida | A61B 6/487 |
| 2019/0107988 | A1* | 4/2019 | Kato | H04M 3/567 |
| 2019/0242714 | A1* | 8/2019 | Shaked | G01C 21/3878 |
| 2020/0155096 | A1* | 5/2020 | Hattori | A61B 6/467 |
| 2020/0219228 | A1 | 7/2020 | Ji et al. | |
| 2020/0219248 | A1 | 7/2020 | Kaneko | |
| 2020/0327315 | A1* | 10/2020 | Mullins | G06V 40/103 |
| 2020/0374498 | A1* | 11/2020 | Sodhi | H04N 9/3176 |
| 2021/0042561 | A1* | 2/2021 | Akira | G06T 7/0002 |
| 2021/0072165 | A1 | 3/2021 | Kaneko | |
| 2021/0096089 | A1 | 4/2021 | Shimizu | |
| 2021/0186453 | A1* | 6/2021 | Lalena | A61B 6/4283 |
| 2023/0078218 | A1* | 3/2023 | Wang | G06N 3/098<br>706/12 |

FOREIGN PATENT DOCUMENTS

| | | | |
|---|---|---|---|
| JP | 2007-225351 | A | 9/2007 |
| JP | 2018-075229 | A | 5/2018 |
| JP | 2019-072457 | A | 5/2019 |
| JP | 2021-056136 | A | 4/2021 |
| WO | 2016/174926 | A1 | 11/2016 |
| WO | 2017/130477 | A1 | 8/2017 |
| WO | 2017/130550 | A1 | 8/2017 |
| WO | 2019/059011 | A1 | 3/2019 |
| WO | 2020/003917 | A1 | 1/2020 |

OTHER PUBLICATIONS

Jeffrey Yapp et al., "Quantitative Analysis and Visualization with 3D Slicer", Jan. 1, 2011, URL:http://wiki.na-mic.org/Wiki/images/c/ca/RSNA2011_QI.pdf, slide 59, total 86 pages.

International Search Report issued in PCT/JP2022/030413; mailed Nov. 1, 2022.

International Preliminary Report on Patentability (Chapter I) and Written Opinion of the International Searching Authority issued in PCT/JP2022/030413; issued Apr. 2, 2024.

"Notice of Reasons for Refusal" Office Action issued in JP 2023-550427; mailed by the Japanese Patent Office on Jun. 3, 2026.

An Office Action mailed by the Japanese Patent Office on Oct. 21, 2026, in connection with Japanese Patent Application No. 2023-550427.

* cited by examiner

IMAGE PROCESSING APPARATUS, PROCESSING SYSTEM, IMAGE DISPLAY METHOD, AND PROGRAM

CROSS-REFERENCE TO RELATED APPLICATIONS

The present application is a Continuation of PCT International Application No. PCT/JP2022/030413 filed on Aug. 9, 2022 claiming priority under 35 U.S.C § 119(a) to Japanese Patent Application No. 2021-161061 filed on Sep. 30, 2021. Each of the above applications is hereby expressly incorporated by reference, in its entirety, into the present application.

BACKGROUND OF THE INVENTION

1. Field of the Invention

The present invention relates to an image processing apparatus, a processing system, an image display method, and a program.

2. Description of the Related Art

In non-destructive inspection of an industrial product, a technique of supporting defect determination using an image is known. For example, in non-destructive inspection of an industrial product using an X-ray transmission image or the like, a transmission image obtained by capturing an industrial product to be inspected through transmission imaging is visually observed, defects such as air bubbles, foreign substances, and fissuring generated in the industrial product to be inspected are detected, and whether the industrial product to be inspected is a good product or a defective product is determined.

JP2007-225351A discloses a defect review device that acquires an SEM image of a wafer using a scanning electron microscope, detects defects from the SEM image, and displays a plurality of images for each of the defects. SEM is an abbreviation for Scanning Electron Microscope.

WO2017/130550A discloses a defect inspection device that detects a defect candidate from an image obtained by capturing an industrial product to be inspected and displays the defect candidate. The device disclosed in WO2017/130550A displays a defect candidate image representing the defect candidate on the captured image. In addition, the device disclosed in WO2017/130550A is configured to select a type of a defect to be displayed by using a slider, a check box, and the like.

SUMMARY OF THE INVENTION

However, the defects in the transmission image have a weak signal intensity and poor visibility, and, in a case in which the presence or absence of the defects is evaluated by visual observation, erroneous detection such as overlooking of the defects and excessive detection of the defects may occur. The poor visibility of the defects may hinder effective utilization of the automatically detected defects, may cause unnecessary confusion, and may reduce an efficiency of inspection work.

In a display aspect adopted in the device disclosed in JP2007-225351A in which a plurality of images are displayed for each defect, for example, it is difficult to understand a correspondence relationship between a low-magnification captured image and a high-magnification captured image, and it is difficult to provide suitable environment inspection work of performing visual confirmation in the device disclosed in JP2007-225351A.

In the superimposed display of the defect candidate on the captured image via the device disclosed in WO2017/130550A, the visibility of the defect candidate is poor, and it is difficult to provide suitable environment in inspection work of performing visual confirmation. In addition, switching the type of defect to be displayed is complicated for an operator and is not a suitable solution. Here, the problems in the defect inspection are presented, but the above-described problems may also exist in evaluation and analysis, interpretation, and measurement of the industrial product.

The present invention has been made in view of such circumstances, and an object of the present invention is to provide an image processing apparatus, a processing system, an image display method, and a program capable of securing good visibility in a processing target.

An image processing apparatus according to the present disclosure comprises: one or more processors, in which the one or more processors acquire a processing target image generated by imaging a processing target, display the processing target image on a first region of a first display device, acquire a region-of-interest image in which a region-of-interest in the processing target is reproduced, display the region-of-interest image on a second region different from the first region of the first display device, or display the region-of-interest image on a second display device different from the first display device, and operate one of the processing target image or the region-of-interest image in conjunction with an operation on the other.

According to the image processing apparatus according to the present disclosure, one of the processing target image displayed on the first region of the first display device or the region-of-interest image displayed on the second region of the first display device or the second display device is operated in conjunction with an operation on the other. As a result, good visibility of the region-of-interest in the processing target is secured. In addition, it is possible to easily understand a response of one operation to the other operation for variation in the processing target image or the region-of-interest image.

The acquisition of the processing target image can include an aspect of acquiring the processing target image itself and an aspect of acquiring an image serving as a base for the processing target image and generating the processing target image by performing defined image processing on the acquired image. Similarly, the acquisition of the region-of-interest image can include an aspect of acquiring the region-of-interest image itself and an aspect of acquiring an image serving as a base for the region-of-interest image and generating the region-of-interest image by performing defined image processing on the acquired image.

The region-of-interest image can include a single-color background. The same size as the processing target image can be applied to the region-of-interest image. In addition, the same scale as the processing target image can be applied to the region-of-interest image in a case of displaying the region-of-interest image. That is, the region-of-interest image is an image including the region-of-interest in the processing target image, and can be an image in which a position and a shape of the region-of-interest are reproduced.

Examples of the processing to be performed on the processing target include defect inspection, analysis, classification, and evaluation. Examples of the region-of-interest include a defect region of the processing target, an inspection target region, an analysis target region, a region contributing to classification, and a region contributing to evaluation.

The image processing apparatus according to the present disclosure comprises one or more memories that store programs to be executed by one or more processors, in which the one or more processors are configured to execute commands of the programs.

In the image processing apparatus according to another aspect, the one or more processors may acquire a transmission image generated based on a light ray or radiation transmitted through the processing target, as the processing target image, and display the transmission image as the processing target image.

According to this aspect, it is possible to easily understand a response of one operation to the other operation for variation in a transmission image of the processing target or the region-of-interest image.

In the image processing apparatus according to another aspect, the one or more processors may acquire a transmission image generated based on a light ray or radiation transmitted through the processing target, as the processing target image, generate a frequency selection image by performing frequency selection processing on the transmission image, and display the frequency selection image as the processing target image.

According to this aspect, it is possible to secure good visibility of the region-of-interest in the processing target.

In the image processing apparatus according to another aspect, the one or more processors may acquire a processing target image operation command representing an operation on the processing target image, and operate the processing target image in accordance with the processing target image operation command, and operate the region-of-interest image in conjunction with the operation on the processing target image.

According to this aspect, it is possible to operate the region-of-interest image in conjunction with the operation on the processing target image.

In the image processing apparatus according to another aspect, the one or more processors may acquire a processing target image change command for changing a position of the processing target image, as the processing target image operation command, and change the position of the processing target image in accordance with the processing target image change command.

According to this aspect, it is possible to change a position of the region-of-interest image in accordance with the position change of the processing target image.

In the image processing apparatus according to another aspect, the one or more processors may acquire a processing target image change command for changing a magnification ratio of the processing target image, as the processing target image operation command, and change magnification of the processing target image in accordance with the processing target image change command.

According to this aspect, it is possible to change a magnification of the region-of-interest image in accordance with the magnification change of the processing target image.

In the image processing apparatus according to another aspect, the one or more processors may acquire a region-of-interest image operation command representing an operation on the region-of-interest image, and operate the region-of-interest image in accordance with the region-of-interest image operation command, and operate the processing target image in conjunction with the operation on the region-of-interest image.

According to this aspect, it is possible to operate the processing target image in conjunction with the operation on the region-of-interest image.

In the image processing apparatus according to another aspect, the one or more processors may acquire a region-of-interest image change command for changing a position of the region-of-interest image, as the region-of-interest image operation command, and change the position of the region-of-interest image in accordance with the region-of-interest image change command.

According to this aspect, it is possible to change a position of the processing target image in accordance with the position change of the region-of-interest image.

In the image processing apparatus according to another aspect, the one or more processors may acquire a region-of-interest image change command for changing a magnification ratio of the region-of-interest image, as the region-of-interest image operation command, and change magnification of the region-of-interest image in accordance with the region-of-interest image change command.

According to this aspect, it is possible to change a magnification of the processing target image in accordance with the magnification change of the region-of-interest image.

In the image processing apparatus according to another aspect, the one or more processors may automatically detect the region-of-interest from the processing target image, generate the region-of-interest image based on the automatically detected region-of-interest in the processing target image, and acquire the generated region-of-interest image.

According to this aspect, it is possible to acquire the region-of-interest image based on the automatically detected region-of-interest.

In the image processing apparatus according to another aspect, the one or more processors may store the processing target image and an automatic detection result of the region-of-interest in association with each other, generate a first learning model that is trained using a set of the processing target image and the automatic detection result of the region-of-interest as learning data, and apply the first learning model to the automatic detection of the region-of-interest.

According to such an aspect, it is possible to secure a certain accuracy in the automatic detection of the region-of-interest.

In the image processing apparatus according to another aspect, the one or more processors may acquire the region-of-interest image generated in advance, based on the region-of-interest detected in advance from the processing target image.

According to this aspect, it is possible to display the region-of-interest image generated in advance on the second region.

In the image processing apparatus according to another aspect, the one or more processors may receive correction for the region-of-interest, and correct the region-of-interest image based on the correction.

According to this aspect, it is possible to apply the region-of-interest image in which the region-of-interest has been corrected.

In the image processing apparatus according to another aspect, the one or more processors may store the region-of-interest image and a correction result of the region-of-interest image in association with each other, generate a second learning model that is trained using a set of the region-of-interest image and the correction result of the region-of-interest image as learning data, and apply the second learning model to the automatic detection of the region-of-interest.

According to this aspect, it is possible to automatically detect the region-of-interest in which the correction of the region-of-interest is reflected.

In the image processing apparatus according to another aspect, the one or more processors may superimpose and display grids that are linked to each other on the processing target image and the region-of-interest image.

According to this aspect, it is possible to efficiently confirm the correspondence relationship between the processing target image displayed on the first region and the region-of-interest image displayed on the second region.

An aspect in which the grid has a unit length in each of two directions orthogonal to each other can be applied.

In the image processing apparatus according to another aspect, the one or more processors may receive a position designation operation for designating a position on one of the processing target image or the region-of-interest image, and perform emphasis processing to emphasize a position in the other corresponding to the position designated in the one, in accordance with the position designation operation on the one.

According to this aspect, it is possible to improve visibility of the correspondence relationship between the processing target image displayed on the first region and the region-of-interest image displayed on the second region.

An example of the emphasis processing is to lower a brightness value of a pixel other than a pixel at the designated position and relatively increase brightness at the designated position.

In the image processing apparatus according to another aspect, the one or more processors may receive a position designation operation for designating a position on one of the processing target image or the region-of-interest image, and display a pointer at a position in the other corresponding to the position designated in the one, in accordance with the position designation operation on the one.

According to this aspect, it is possible to avoid adding complicated information to the processing target image and the region-of-interest image and efficiently confirm the correspondence relationship between the processing target image and the region-of-interest image.

In the image processing apparatus according to another aspect, the one or more processors may receive a ruler operation on one of the processing target image or the region-of-interest image, and display a ruler operation on the other corresponding to the ruler operation on the one, in accordance with the ruler operation on the one.

According to this aspect, it is possible to execute processing such as measurement of the region-of-interest and evaluation of the region-of-interest in a state where good visibility is secured.

Examples of the ruler operation include an operation of assigning an indicator such as a line used for measurement and evaluation of a defect region to the defect region.

In the image processing apparatus according to another aspect, the one or more processors may acquire a type of the region-of-interest, display the type of the region-of-interest on the first region, and display the type of the region-of-interest on the second region or the second display device in association with the type of the region-of-interest displayed on the first region.

According to this aspect, it is possible to confirm a type of the defect region.

In the image processing apparatus according to another aspect, the one or more processors may display the processing target image in grayscale, and display the region-of-interest image in color.

According to this aspect, information on a defect region image is colorized. As a result, it is possible to improve the efficiency of the inspection work.

In this aspect, a monochrome display device may be applied to display the processing target image, and a color display device may be applied to display the region-of-interest image.

In the image processing apparatus according to another aspect, the one or more processors may switch between a first display mode in which only the processing target image is displayed and a second display mode in which the processing target image and the region-of-interest image are displayed.

According to this aspect, it is possible to display the region-of-interest image as necessary.

A processing system according to the present disclosure comprises: an imaging apparatus that images a processing target; and one or more processors, in which the one or more processors acquire a processing target image generated by imaging the processing target, display the processing target image on a first region of a first display device, acquire a region-of-interest image in which a region-of-interest in the processing target is reproduced, display the region-of-interest image on a second region different from the first region of the first display device, or display the region-of-interest image on a second display device different from the first display device, and operate one of the processing target image or the region-of-interest image in conjunction with an operation on the other.

According to the processing system according to the present disclosure, it is possible to obtain the same operation and effect as those of the image processing apparatus according to the present disclosure. Configuration requirements of the image processing apparatus according to another aspect can be applied to configuration requirements of a processing system according to another aspect.

An image display method according to the present disclosure comprises: via a computer, acquiring a processing target image generated by imaging a processing target; displaying the processing target image on a first region of a first display device; acquiring a region-of-interest image in which a region-of-interest in the processing target is reproduced; displaying the region-of-interest image on a second region different from the first region of the first display device, or displaying the region-of-interest image on a second display device different from the first display device; and operating one of the processing target image or the region-of-interest image in conjunction with an operation on the other.

According to the image display method according to the present disclosure, it is possible to obtain the same operation and effect as those of the image processing apparatus according to the present disclosure. Configuration requirements of the image processing apparatus according to another aspect can be applied to configuration requirements of an image display method according to another aspect.

A program according to the present disclosure causes a computer to realize: a function of acquiring a processing target image generated by imaging a processing target; a function of displaying the processing target image on a first region of a first display device; a function of acquiring a region-of-interest image in which a region-of-interest in the processing target is reproduced; a function of displaying the region-of-interest image on a second region different from the first region of the first display device, or displaying the region-of-interest image on a second display device different from the first display device; and a function of operating one of the processing target image or the region-of-interest image in conjunction with an operation on the other.

According to the program according to the present disclosure, it is possible to obtain the same operation and effect as those of the image processing apparatus according to the present disclosure. Configuration requirements of the image processing apparatus according to another aspect can be applied to configuration requirements of a program according to another aspect.

According to the present invention, one of the processing target image displayed on the first region of the first display device or the region-of-interest image displayed on the second region of the first display device or the second display device is operated in conjunction with an operation on the other. As a result, good visibility of the region-of-interest in the processing target is secured. In addition, it is possible to easily understand a response of one operation to the other operation for variation in the processing target image or the region-of-interest image.

DESCRIPTION OF THE PREFERRED EMBODIMENTS

Figure 1:
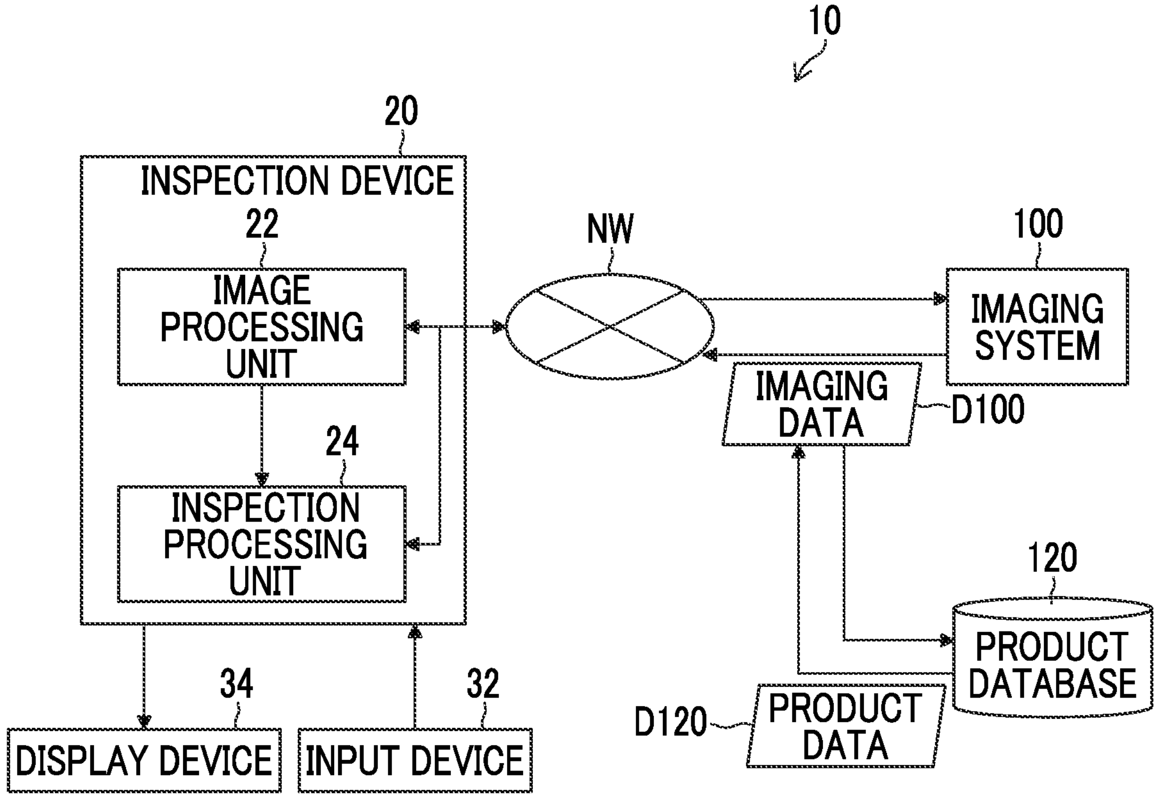
FIG. 1 is a configuration diagram of a defect inspection system according to an embodiment.

Hereinafter, preferred embodiments of the present invention will be described with reference to the accompanying drawings. In the present specification, the same components are denoted by the same reference numerals, and duplicate description thereof will be omitted as appropriate.

Configuration Example of Defect Inspection System

FIG. 1 is a configuration diagram of a defect inspection system according to an embodiment. A defect inspection system 10 detects, based on captured image data obtained by imaging the industrial product which is an inspection target, a defect of the inspection target, and notifies of the presence or absence of the defect in the inspection target. That is, the defect inspection system 10 supports the defect inspection of the inspection target.

The defect inspection system 10 comprises an inspection device 20, an imaging system 100, and a product database 120. An input device 32 and a display device 34 are connected to the inspection device 20 via an input/output interface. The input/output interface is not shown in FIG. 1.

The inspection device 20, the imaging system 100, and the product database 120 execute data communication with each other via a network NW. The inspection device 20 acquires imaging data D100 from the imaging system 100 via the network NW. The inspection device 20 acquires product data D120 from the product database 120 via the network NW.

A communication form of the network NW may be wired communication or wireless communication. A local area network (LAN), a wide area network (WAN), the Internet, or the like can be applied as the network NW.

A computer can be applied as the inspection device 20. A form of the computer may be a server, a personal computer, a workstation, a tablet terminal, and the like.

The inspection device 20 acquires information input by an inspection operator, who is an image interpreter, using the input device 32. A keyboard, a pointing device, and the like can be applied as the input device 32. Examples of the pointing device include a mouse, a trackball, and a joystick.

The inspection device 20 displays various kinds of information such as a captured image of the inspection target and an inspection result on the display device 34. One display device 34 may be connected to the inspection device 20, or a plurality of the display devices 34 may be connected to the inspection device 20.

The inspection device 20 comprises an image processing unit 22 and an inspection processing unit 24. The image processing unit 22 acquires the imaging data D100 including captured image data and performs the defined image processing on the captured image data. The image processing unit 22 displays an image generated by performing the image processing on the display device 34. For example, the image processing unit 22 displays a defect detected from the captured image data.

The inspection processing unit 24 executes defect inspection of the inspection target based on the imaging data of the inspection target and generates inspection data. For example, the inspection processing unit 24 detects a defect of the inspection target from the captured image data and generates inspection data representing the presence or absence of the defect in the inspection target by using a detection result of the defect.

Configuration Example of Imaging System

Figure 2:
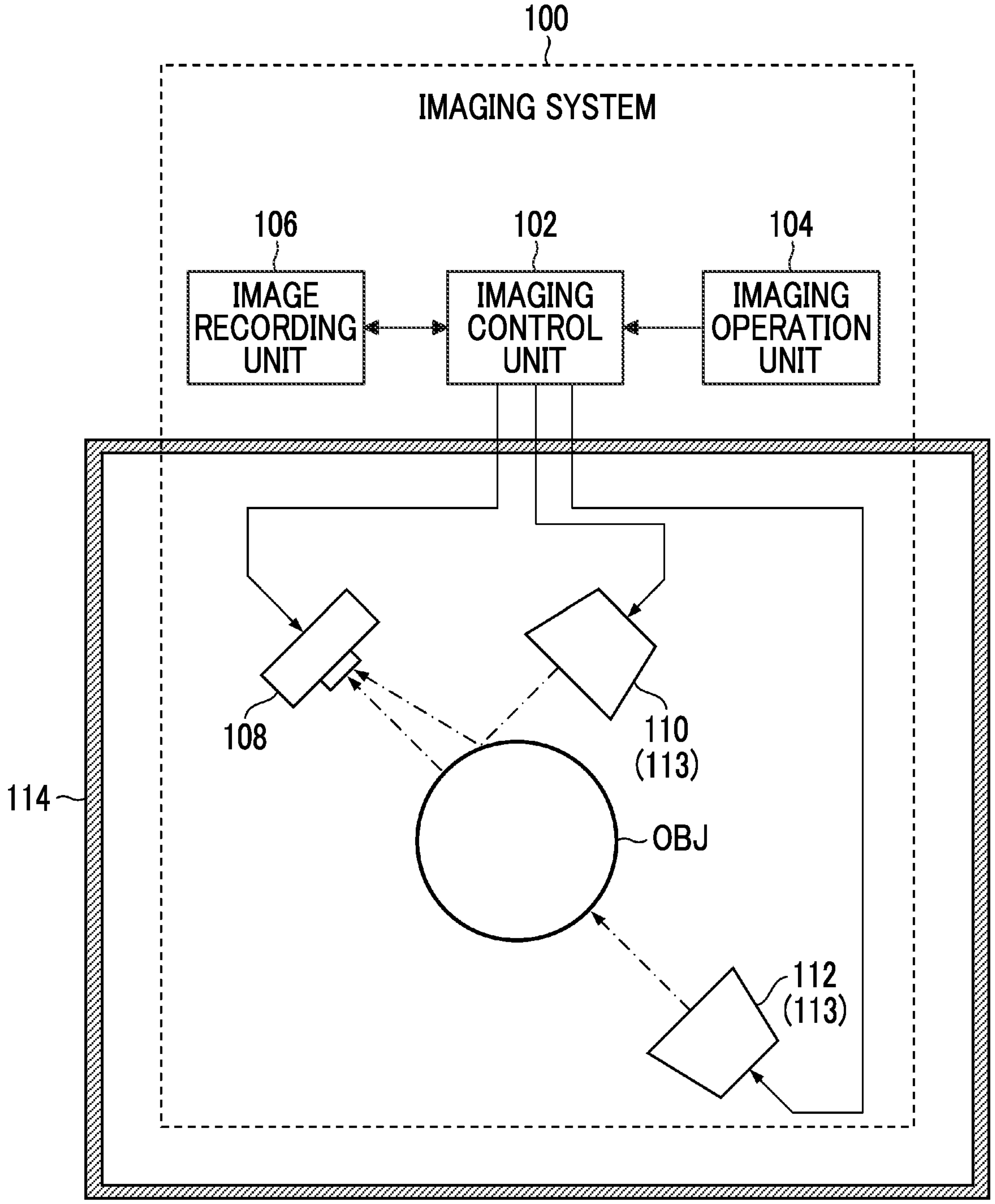
FIG. 2 is a block diagram showing a configuration example of an imaging system shown in FIG. 1.

FIG. 2 is a block diagram showing a configuration example of the imaging system shown in FIG. 1. The imaging system 100 images an inspection target OBJ placed in an imaging room 114 and generates captured image data of the inspection target OBJ. The imaging system 100 comprises an imaging control unit 102, an imaging operation unit 104, an image recording unit 106, a camera 108, a first radiation source 110, and a second radiation source 112. Hereinafter, in a case in which distinction between the first radiation source 110 and the second radiation source 112 is not needed, both the first radiation source 110 and the second radiation source 112 are referred to as a radiation source 113.

The imaging control unit 102 controls an operation of each unit of the imaging system 100. The imaging control unit 102 comprises a central processing unit (CPU). The imaging control unit 102 receives an operation input from an operator via the imaging operation unit 104, and transmits a control signal corresponding to the operation input to each unit of the imaging system 100 to control the operation of each unit.

The imaging operation unit 104 is an input device operated by the operator. The same configuration as the input device 32 shown in FIG. 1 can be applied to the imaging operation unit 104. The operator may input an instruction to execute imaging to the camera 108 using the imaging operation unit 104. The input of the instruction to execute imaging can include setting of imaging conditions, such as an exposure time, a focal length, and a stop, an imaging angle, an imaging point, and the like.

The operator can execute input of information regarding the inspection target OBJ, input of an instruction to irradiate the radiation source 113 with radiation, and input of an instruction to record the acquired image data in the image recording unit 106, by using the imaging operation unit 104. The input of the instruction to irradiate the radiation source 113 with radiation can include setting of an irradiation start time, an irradiation duration time, an irradiation angle, an irradiation intensity, and the like.

The image recording unit 106 records the generated captured image data of the inspection target OBJ, which is captured by using the camera 108. In the image recording unit 106, information for specifying the inspection target OBJ is recorded in association with the captured image data. The term "recording" in the present specification is synonymous with the term "storing".

The camera 108, the first radiation source 110, and the second radiation source 112 are disposed inside the imaging room 114. The first radiation source 110 and the second radiation source 112 emit X-rays as radiation.

A partition wall between the imaging room 114 and the outside and an entrance of the imaging room 114 are protected from X-ray by an X-ray protective material such as lead or concrete. In a case in which the inspection target OBJ is irradiated with visible light for imaging, it is not necessary to use the imaging room 114 with X-ray protection.

The first radiation source 110 and the second radiation source 112 irradiate the inspection target OBJ placed inside the imaging room 114 with radiation in response to an instruction transmitted from the imaging control unit 102. The first radiation source 110 and the second radiation source 112 are supported such that a distance and an angle with respect to the inspection target OBJ can be adjusted.

The camera 108 receives radiation emitted from the first radiation source 110 to the inspection target OBJ and reflected from the inspection target OBJ, or radiation emitted from the second radiation source 112 to the inspection target OBJ and transmitted through the inspection target OBJ, and generates a reflected image of the inspection target OBJ or a transmission image of the inspection target OBJ. The camera 108 is supported such that a distance and an angle with respect to the inspection target OBJ can be adjusted. As a support member that supports the first radiation source 110, the second radiation source 112, and the camera 108, a manipulator, a mounting table, a movable mounting table, or the like can be applied.

The operator can adjust a distance of the first radiation source 110, the second radiation source 112, and the camera 108 with respect to the inspection target OBJ, and image any position of the inspection target OBJ by using the camera 108.

The imaging control unit 102 ends the irradiation of the inspection target OBJ with the radiation from the first radiation source 110 and the second radiation source 112 in accordance with the end of the imaging of the camera 108.

Although an example in which the camera 108 is disposed inside the imaging room 114 is shown in FIG. 2, the camera 108 need only image the inspection target OBJ inside the imaging room 114 and may be disposed outside the imaging room 114.

FIG. 2 illustrates the imaging system 100 comprising one camera 108 and one first radiation source 110 and one second radiation source 112, but the number of the cameras 108, the first radiation sources 110, and the second radiation sources 112 is not limited to the example shown in FIG. 2. The imaging system 100 may comprise a plurality of cameras, or may comprise a plurality of the first radiation sources 110 and a plurality of the second radiation sources 112.

The defect inspection system 10 described in the embodiment is an example of the processing system. The imaging system 100 described in the embodiment is an example of the imaging apparatus.

Configuration Example of Imaging Data of Inspection Target

Figure 3:
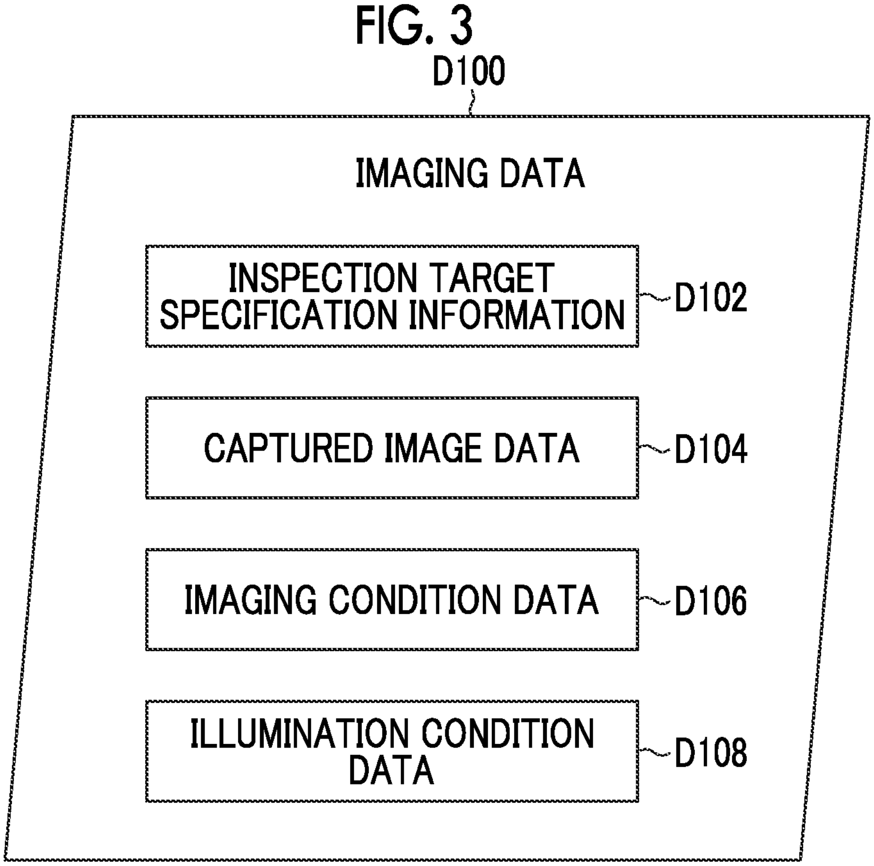
FIG. 3 is a configuration diagram of imaging data.

FIG. 3 is a configuration diagram of the imaging data. The imaging data D100 transmitted from the imaging system 100 shown in FIG. 2 to the inspection device 20 shown in FIG. 1 includes inspection target specification information D102, captured image data D104, imaging condition data D106, and illumination condition data D108.

The inspection target specification information D102 is information used for specifying the inspection target OBJ, and can include, for example, information indicating a product name, a product number, a manufacturer name, a technical classification, and the like of the inspection target OBJ.

The captured image data D104 is image data representing the inspection target OBJ, which is generated by imaging the inspection target OBJ. In a case in which X-rays are emitted from the radiation source 113, X-ray transmission image data is generated as the captured image data D104.

The imaging condition data D106 is associated with the captured image data D104 and is stored for each captured image data D104. The imaging condition data D106 can include information indicating imaging date and time, an imaging target point, a distance between the inspection target OBJ and the camera 108 in a case of performing imaging, an angle of the camera 108 with respect to the inspection target OBJ in a case of performing imaging, and the like for each captured image data.

The illumination condition data D108 can include information indicating a type of radiation, an irradiation intensity, an irradiation angle, and the like used for imaging the inspection target OBJ. In a case in which an illumination device that irradiates the inspection target OBJ with a ray such as a visible ray is provided, the illumination condition data D108 can include information indicating a type of the ray.

Configuration Example of Product Data

Figure 4:
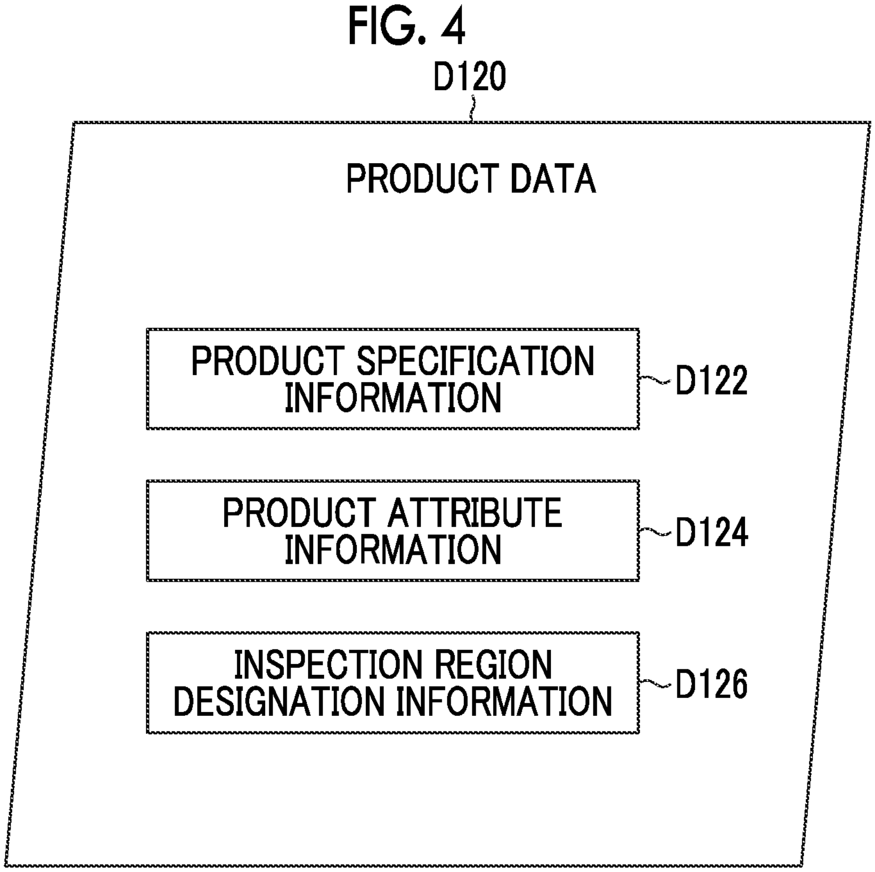
FIG. 4 is a configuration diagram of product data.

FIG. 4 is a configuration diagram of the product data. The product data D120 transmitted from the product database 120 shown in FIG. 1 to the inspection device 20 includes product specification information D122, product attribute information D124, and inspection region designation information D126.

The product data D120 is transmitted from the product database 120 to the inspection device 20 in accordance with the inspection target specification information D102 of the inspection target OBJ. The inspection device 20 stores the imaging data D100 and the product data D120 in association with each other.

The product specification information D122 is information for specifying the inspection target OBJ, and can include, for example, information indicating a product name, a product number, a manufacturer name, and a technical classification. The product specification information D122 includes information that can be collated with the inspection target specification information D102.

The product attribute information D124 can include, for example, information indicating a material of each part of the product, a dimension of each part of the product, a use of the product, and the like. The information indicating the use of the product can include, for example, information regarding a name, a type, a processing state, and an attachment method of a device or the like to which the product is attached. Examples of the attachment method include bonding, welding, screwing, fitting, and soldering.

In addition, the product attribute information D124 includes defect generation information. The defect generation information can include at least one information of past inspection date and time, a material of the inspection target OBJ, positional information, a shape, a size, a depth, and a generation site generated in the past, frequency information related to a defect generation frequency, or a captured image of the defect.

Examples of the type of defect include a foreign substance, an air bubble, and a crack. Examples of the generation site include a site coordinate, a material wall thickness, and a processing state. Examples of the processing state include a processing state of the bonded portion and a processing state of the welded portion.

The inspection region designation information D126 includes information indicating the inspection region designated for each product designated by the manufacturer or the like. The information indicating the inspection region is information including the position of the inspection region, and can be created based on the defect generation information such as the presence or absence of generation of the defect in the past and the frequency information related to the defect generation frequency. The inspection region designation information D126 is created based on information obtained in a case where the manufacturer or the like has repaired the product in the past, or based on specification of a point where the defect is likely to occur statistically or structurally.

The defect generation information can include at least one information of past inspection date and time, a material of the inspection target OBJ, a type, a shape, a size, a depth, and a generation site of the defect generated in the past, or a captured image of the defect.

Configuration Example of Inspection Data

Figure 5:
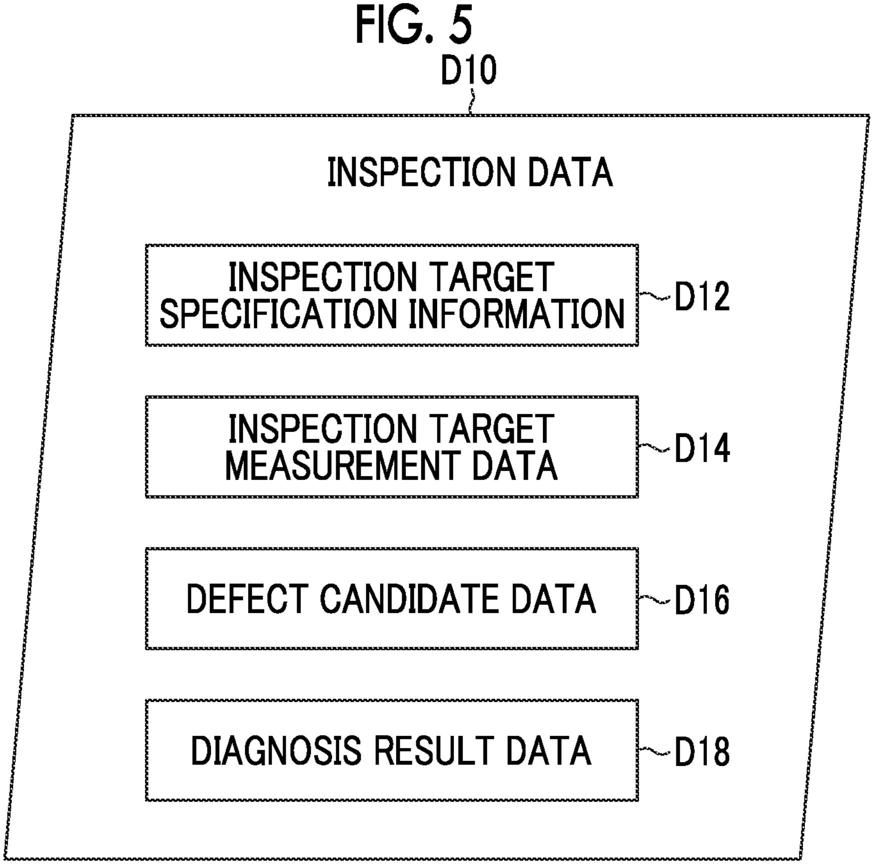
FIG. 5 is a configuration diagram of inspection data.

FIG. 5 is a configuration diagram of the inspection data. Inspection data D10 shown in FIG. 5 is generated and output using the inspection device 20 shown in FIG. 1. As the output of the inspection data D10, the display on the display device 34 can be applied. As the output of the inspection data D10, the output of an electric signal and printing or the like using a printer may be applied.

The inspection data D10 includes inspection target specification information D12, inspection target measurement data D14, defect candidate data D16, and diagnosis result data D18. The inspection target specification information D12 is information for specifying the inspection target OBJ in the inspection data D10, and can include information indicating a product name, a product number, a manufacturer name, and a technical classification, as with the inspection target specification information D102 in the imaging data D100. The inspection data D10 is stored in association with the imaging data D100 by using the inspection target specification information D12.

The inspection target measurement data D14 is acquired by measuring each part of the inspection target OBJ. The inspection target measurement data D14 includes information such as the overall size of the inspection target OBJ and a measured value for each measurement position of the inspection target OBJ.

The defect candidate data D16 includes information regarding a defect candidate obtained as a result of the defect detection. The defect candidate data D16 includes information indicating the characteristics of the defect candidate, such as a position of the defect candidate, a size of the defect candidate, an amount of change in wall thickness in the defect candidate, and a type of the defect candidate.

As the information indicating the position of the defect candidate, a coordinate value in a coordinate system applied to the measurement of the inspection target OBJ can be applied. Examples of the coordinate system include a three-dimensional orthogonal coordinate system, a polar coordinate system, and a cylindrical coordinate system.

The information indicating the type of defect candidate is created based on the shape of the defect candidate detected from the captured image data of the inspection target OBJ. Examples of the information indicating the type of defect candidate include a grain-like defect, a stain-like defect, and a crack-like defect. The type of the defect candidate described in the embodiment is an example of the type of the defect region.

The diagnosis result data D18 includes the inspection date and time and information additionally input by the inspection operator with respect to the defect candidate. Examples of the diagnosis result data include information indicating the exchange of the inspection target OBJ, information indicating the follow-up observation of the inspection target OBJ, and information representing that there is no defect. The information indicating the follow-up observation of the inspection target OBJ can include information regarding a re-inspection.

The inspection data D10 may include at least a part of the imaging data D100. In addition, the inspection data D10 may include at least a part of the product data D120.

The product data D120 stored in the product database 120 may be updated by using the inspection data D10. For example, the inspection region designation information D126 included in the product data D120 can be updated by using the defect candidate data D16 and the diagnosis result data D18 included in the inspection data D10.

The inspection data D10 can include simulation result data representing a result of simulating growth prediction of the defect candidate detected from the inspection target OBJ. The simulation result data can include defect candidate specification information specifying the defect candidate and information representing a degree of growth of the defect candidate in a case in which the inspection target OBJ is used under a defined use condition.

Examples of the defect candidate specification information include a position of the defect candidate and identification information of the defect candidate. Examples of the information indicating the degree of growth of the defect candidate include a degree of spread of a grain-like defect, a degree of spread of a stain-like defect, a degree of decrease in wall thickness, a degree of extension of fissuring, and a depth of fissuring.

The simulation result data can include a simulation result of growth prediction of the defect candidate at a plurality of future time points. The plurality of future time points can be predetermined for each type and use of the inspection target OBJ as an industrial product.

[Problem in Non-Destructive Inspection of Industrial Product Using X-Ray Transmission Image and the Like]

In non-destructive inspection of an industrial product using an X-ray transmission image or the like, a transmission image generated by capturing an industrial product, which is an inspection target, through transmission imaging is visually observed, defects such as air bubbles, foreign substances, and fissuring generated in the industrial product are detected, and whether the industrial product is a good product or a defective product is determined based on a result of the defect detection.

Figure 6:
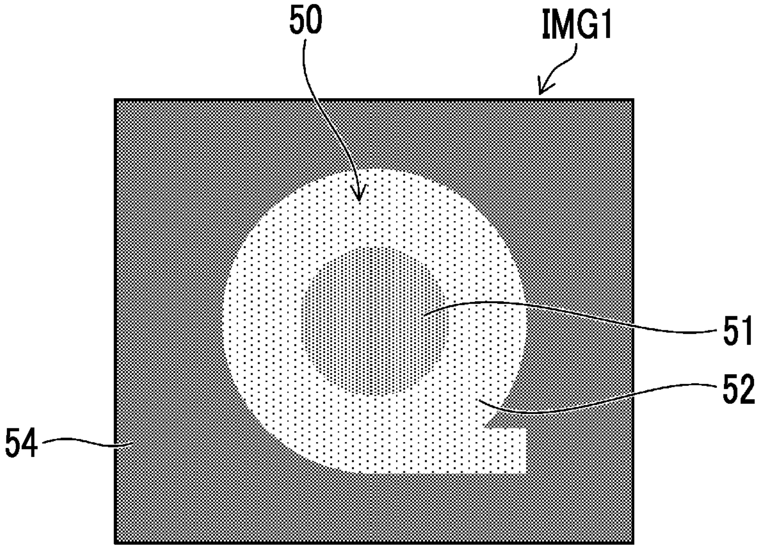
FIG. 6 is a schematic view showing an example of a transmission image.

FIG. 6 is a schematic view showing an example of the transmission image. FIG. 6 shows a transmission image IMG1 in which a metal component 50 molded by applying casting or forging is reflected. The metal component 50 has a first component portion 51 having a relatively thin wall thickness and a second component portion 52 having a thicker wall thickness than the first component portion 51. In the transmission image IMG1, an outer region other than the metal component 50 is a region of a background 54.

Figure 7:
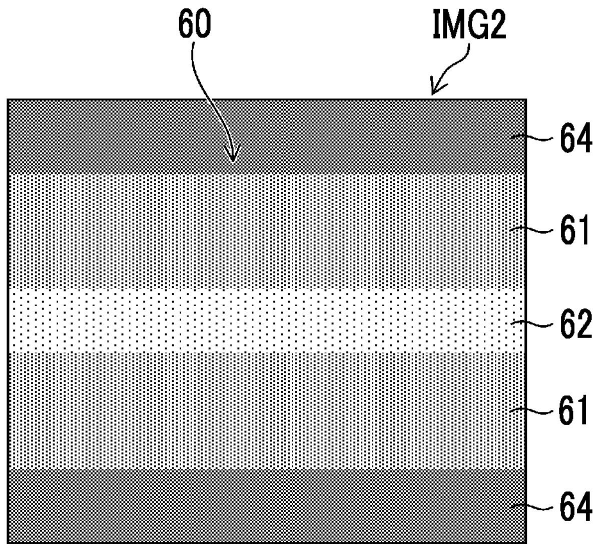
FIG. 7 is a schematic view showing another example of a transmission image.

FIG. 7 is a schematic view showing another example of the transmission image. FIG. 7 shows a transmission image IMG2 in which a metal component 60 manufactured by applying welding is reflected. The metal component 60 has a first component portion 61 having a relatively thin wall thickness and a second component portion 62 having a thicker wall thickness than the first component portion 61. In the transmission image IMG2, an outer region other than the metal component 60 is a region of a background 64.

Figure 8:
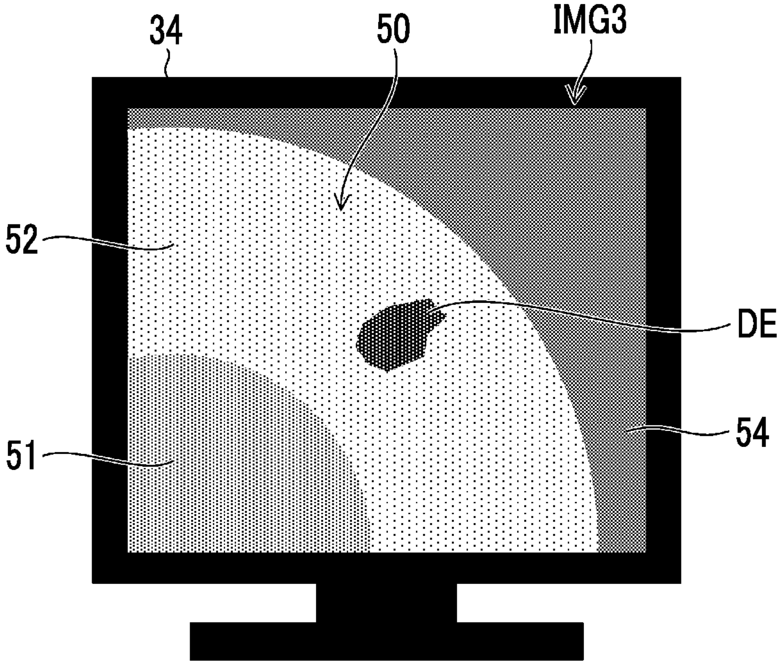
FIG. 8 is a schematic view showing a defect in a transmission image.

FIG. 8 is a schematic view showing a defect in the transmission image. FIG. 8 shows a display screen of the display device 34 on which a transmission image IMG3 obtained by enlarging the transmission image IMG1 shown in FIG. 6 is displayed. In the transmission image IMG3 shown in FIG. 8, a defect DE exists in the second component portion 52.

Examples of the defect DE in a cast or forged metal component or a welded metal component include at least one of an air bubble, a porosity, foreign material less dense (FMLD), or foreign material more dense (FMMD). The FMLD is incorporation of defects of foreign substances (low density) that appear black in the X-ray transmission image. The FMMD is incorporation of defects of foreign substances (high density) that appear white in the X-ray transmission image.

In many cases, it is difficult to distinguish the defect DE reflected in the transmission image IMG from a background in a case of visual observation due to a weak signal intensity, an unclear boundary, and a minute size. As a result, the inspection work is inefficient.

In consideration of such a situation, a device that supports the inspection work is proposed. A device that supports the inspection work improves the efficiency of the inspection work by using the following functions.

A function of performing frequency selection processing on the transmission image IMG1 or the like to generate a frequency selection image and displaying the frequency selection image is provided to facilitate visual observation of a defect having a weak signal intensity and an unclear boundary. The frequency selection processing indicates a series of image processing of performing gradation processing, frequency processing, dynamic range compression processing, and the like on the input image to obtain good visibility of the input image.

The gradation processing is image processing of obtaining appropriate brightness or appropriate density and appropriate contrast, and is realized by applying an input/output correspondence table of a brightness value, and the like. The frequency processing is realized by applying a Fourier transform, a difference between blurred images having different particle sizes, and the like. The dynamic range compression processing is image processing of converting a region where visual recognition is difficult due to whiteout, black crush, or the like into a region where visual recognition is easy without impairing brightness and contrast, and is realized by applying addition of defined brightness to a specific region such as a dark region.

A function of displaying the transmission image IMG1 or the like or the frequency selection image in an enlarged manner, a function of receiving a magnification ratio of the transmission image IMG1 or the like or the frequency selection image, and a function of receiving a change of a position are provided to facilitate visual observation of a minute defect.

A function of providing an operation of adding a marker such as a line segment to the transmission image IMG1 or the like or the frequency selection image, calculating an actual size based on a size of the marker, and displaying the actual size is provided to measure an actual size of the defect by using the marker.

In addition, a function of automatically detecting a defect candidate region, which is a candidate for a defect, in advance is provided to further improve the efficiency of the inspection work. The inspection operator can more efficiently access a region where the presence or absence of the defect is to be determined with reference to the automatically detected defect candidate region, so that the efficiency of the inspection work is improved.

Display Example of Defect in Transmission Image

Figure 9:
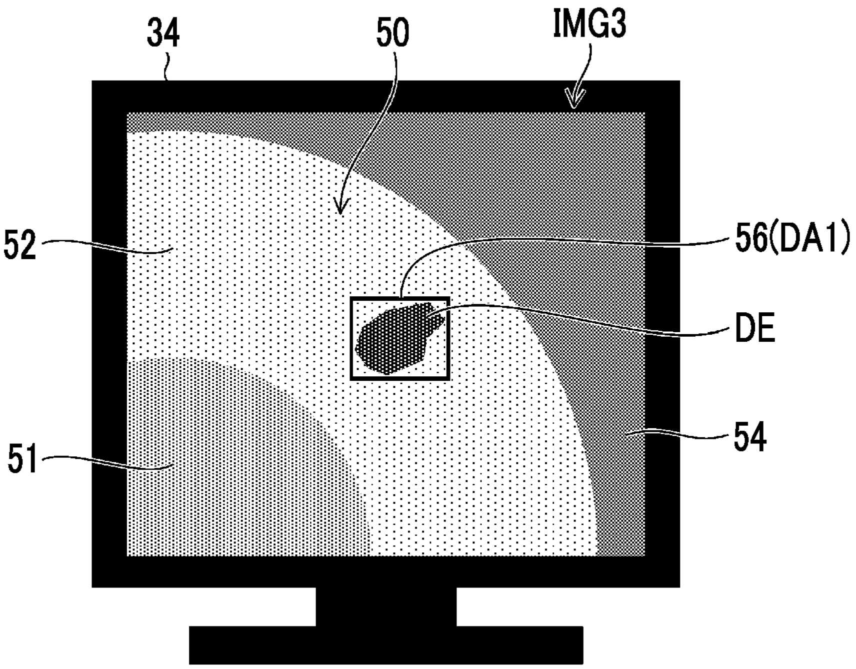
FIG. 9 is a schematic view showing a first display example of a defect region in a transmission image.

FIG. 9 is a schematic view showing a first display example of the defect region in the transmission image. FIG. 9 shows an example in which a frame 56 surrounding the defect DE is superimposed and displayed on the transmission image IMG3 to display a rectangular defect region DA1.

Figure 10:
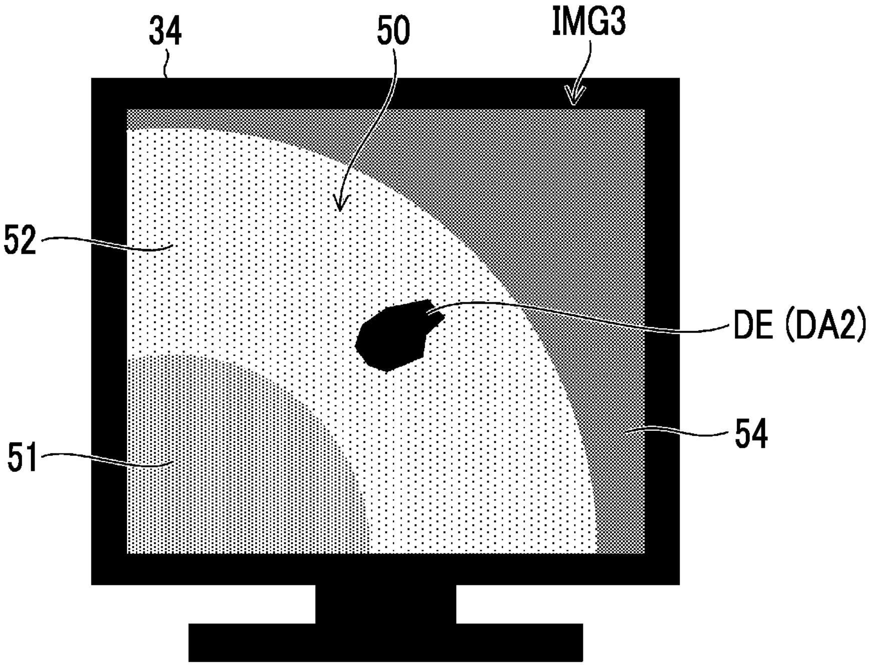
FIG. 10 is a schematic view showing a second display example of a defect region in a transmission image.

FIG. 10 is a schematic view showing a second display example of the defect region in the transmission image. FIG. 10 shows an example in which an adaptive shape of the defect DE is filled, and a defect region DA2 having the same shape and the same size as the defect DE is superimposed and displayed on the transmission image IMG3.

Figure 11:
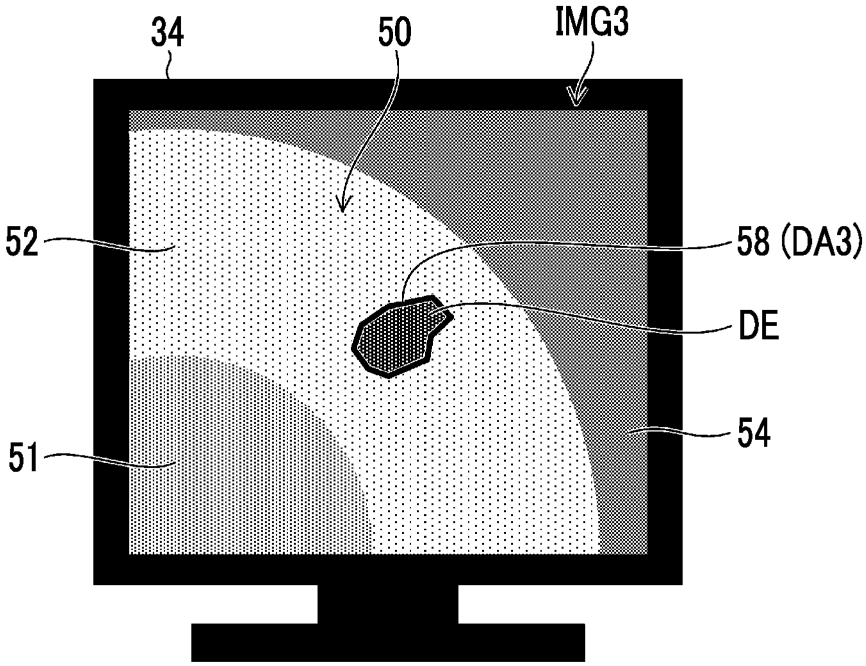
FIG. 11 is a schematic view showing a third display example of a defect region in a transmission image.

FIG. 11 is a schematic view showing a third display example of the defect region in the transmission image. FIG. 11 shows an example in which a contour line 58 of an adaptive shape of the defect DE is superimposed and displayed on the transmission image IMG3 to display a defect region DA3 having the same shape as a contour of the defect DE.

In order to determine whether the metal component 50 is a good product or a defective product, it is necessary to evaluate a severity of the defect DE. The severity of the defect DE depends on the shape of the defect DE. In a case in which the shape of the defect DE is displayed as the defect region, the effect in evaluating the severity of the defect DE is higher than that in a case in which the rectangle surrounding the defect DE is displayed as the defect region.

[Clarification of Problem]

The display device 34 used in a case of visually evaluating the defect DE having a weak signal intensity shown in FIG. 8 and the like can perform high gradation display such as 16 bits of depth in many cases. In addition, a monochrome display device is used for displaying the transmission image IMG in which the grayscale gradation is represented using only the brightness in many cases. The transmission image IMG is a general term for the transmission image IMG1 shown in FIG. 6, the transmission image IMG2 shown in FIG. 7, and the transmission image IMG3 shown in FIGS. 8 to 11.

The possibility that an accurate rectangular pattern drawn using computer graphics appears in the transmission image or the like is relatively low, and the defect region DA1 to which the rectangular frame 56 shown in FIG. 9 is applied can be easily visually recognized even in a case in which a monochrome display device is used.

On the other hand, there is problem in that the defect region DA2 and the defect region DA3 to which the adaptive shape of the defect DE shown in FIGS. 10 and 11 is applied have poor visibility in a case in which a monochrome display device is used.

Specifically, in the filling of the defect DE shown in FIG. 10, even in a case in which the filling is made translucent, the brightness of the transmission image IMG and the brightness of the defect region DA1 cannot be separated as in a color display device, and both are mixed. As a result, it is difficult to accurately visually recognize and evaluate the defect region DA1 of the transmission image IMG.

In addition, in the display of the contour line 58 of the defect DE shown in FIG. 11 is displayed, the contour line 58 is mixed with the defect DE. Further, the contour line 58 is not necessarily a straight line, and it is difficult to determine whether the contour line 58 is a component of the transmission image IMG or a component of the defect DE. In this case, the visibility of the defect region DA3 is poor, which may cause the defect DE to be overlooked by the inspection operator and the defect DE to be excessively detected.

The deterioration of the visibility is a serious problem that hinders the effective use of the automatically detected defect region DA2 and the like and causes unnecessary confusion of the inspection operator, thereby reducing the efficiency of the inspection work.

First Embodiment

Configuration Example of Image Display Method

Figure 12:
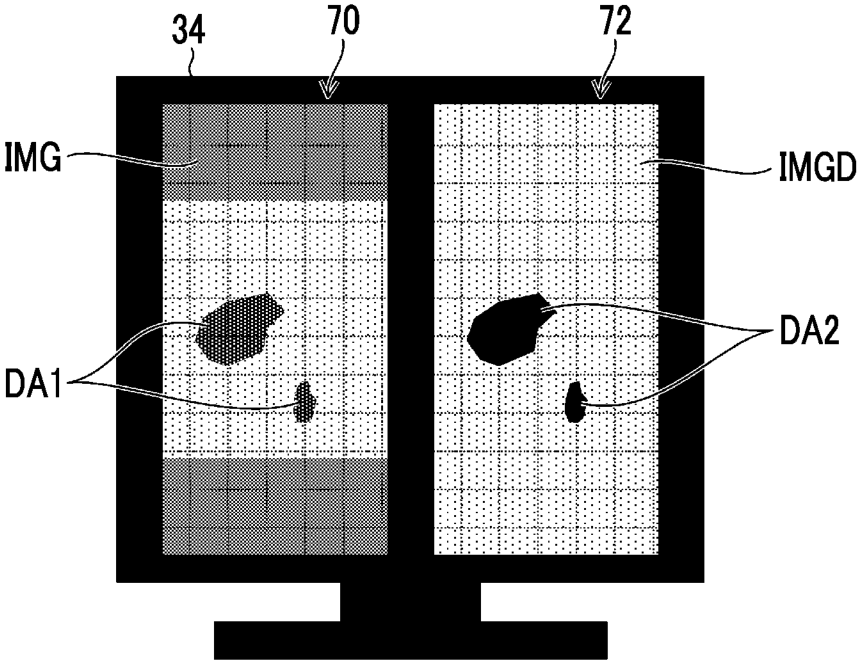
FIG. 12 is a schematic view of a screen to which an image display method according to a first embodiment is applied.

FIG. 12 is a schematic view of a screen to which an image display method according to a first embodiment is applied. Regarding the above-described problem, the image display method according to the first embodiment includes individually displaying the transmission image IMG and a defect region image IMGD representing only the defect region DA2 on a first display window 70 and a second display window 72, and linking the display of the first display window 70 and the second display window 72 and an operation of one of the transmission image IMG and the defect region image IMGD to each other between the display windows. As a result, good visibility of the transmission image IMG and the defect region image IMGD is secured.

That is, in the display device 34 shown in FIG. 12, the first display window 70 on which the transmission image IMG is displayed and the second display window 72 on which the defect region image IMGD is displayed are displayed. The changes of the first display window 70 and the second display window 72 are always linked to each other in accordance with the reception of a change operation such as a change operation of a position and a change operation of a magnification ratio. The change operation of the position and the change operation of the magnification ratio may be an operation executed by the inspection operator or an operation of applying a specified value defined in advance.

As the first display window 70 and the second display window 72, a display region set in one application may be applied or a display region set in one operating system may be applied. The first display window 70 and the second display window 72 may be displayed on individual display devices, respectively.

The defect region image IMGD shown in FIG. 12 has the same shape and the same size as the transmission image IMG. In the defect region image IMGD, the defect region DA2 is disposed at the same position as the defect region DA1 in the transmission image IMG. The defect region DA2 disposed in the defect region image IMGD has the same shape and the same size as the defect region DA1 in the transmission image IMG.

A single-color background may be applied to the defect region image IMGD. FIG. 12 shows the defect region image IMGD in which a single-color background is applied and the same grid as the transmission image IMG is superimposed.

Configuration Example of Image Processing Unit

Figure 13:
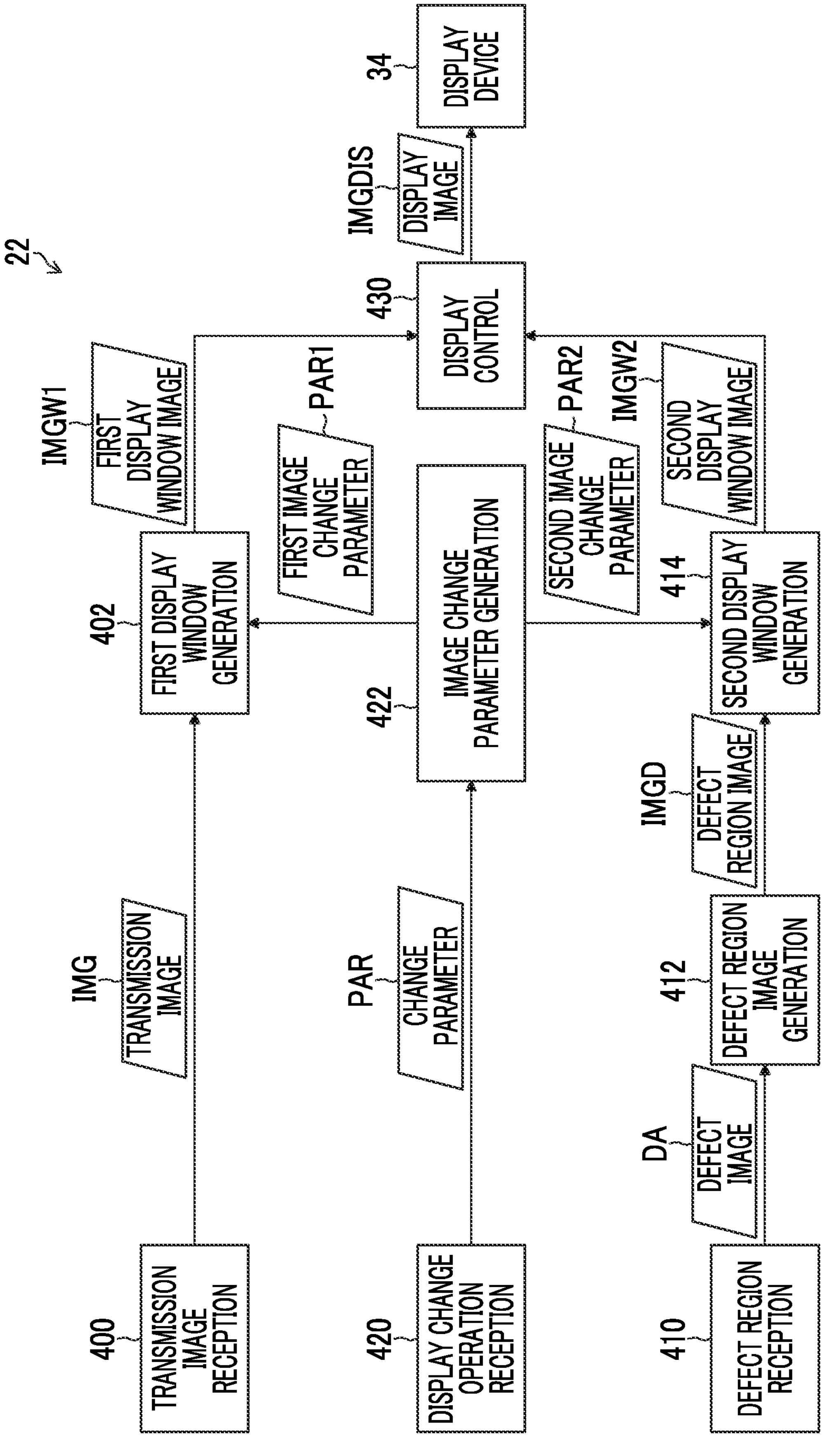
FIG. 13 is a functional block diagram showing an electric configuration of an image processing unit applied to an inspection device according to the first embodiment.

FIG. 13 is a functional block diagram showing an electric configuration of an image processing unit applied to an inspection device according to the first embodiment. The image processing unit 22 shown in FIG. 13 is provided in the inspection device 20 shown in FIG. 1. The image processing unit 22 comprises a transmission image reception portion 400 and a first display window generation portion 402.

The transmission image reception portion 400 receives the transmission image IMG transmitted from the imaging system 100 shown in FIG. 1. The transmission image IMG corresponds to the captured image data D104 of the imaging data D100 shown in FIG. 3. The reception of the transmission image IMG is synonymous with the acquisition of the transmission image IMG. The reception of the image, the data, the signal, and the like shown below is synonymous with the acquisition of the image, the data, the signal, and the like. The transmission image reception portion 400 transmits the transmission image IMG to the first display window generation portion 402.

The first display window generation portion 402 changes the transmission image IMG acquired via the transmission image reception portion 400 to a format for display on the first display window 70 shown in FIG. 12 and outputs the transmission image IMG as a first display window image IMGW1.

The image processing unit 22 comprises a defect region reception portion 410, a defect region image generation portion 412, and a second display window generation portion 414. The defect region reception portion 410 receives information on the defect region DA detected in advance from the transmission image IMG. The information on the defect region DA can be included in the defect candidate data D16 included in the inspection data D10 shown in FIG. 5.

The defect region image generation portion 412 generates the defect region image IMGD by using the information on the defect region DA transmitted from the defect region reception portion 410. The defect region image generation portion 412 outputs the defect region image IMGD.

The defect region reception portion 410 may acquire the defect region image IMGD generated in advance, based on the defect region DA detected in advance. That is, the defect region reception portion 410 may function as a defect region image reception portion that receives the defect region image IMGD generated in advance.

The second display window generation portion 414 changes the defect region image IMGD generated by the defect region image generation portion 412 to a format for display on a second display window 72 shown in FIG. 12 and outputs the defect region image IMGD as a second display window image IMGW2.

The image processing unit 22 comprises a display control portion 430. The display control portion 430 acquires the first display window image IMGW1 and the second display window image IMGW2, and the display control portion 430 for the display device 34 transmits a display image IMGDIS including the first display window image IMGW1 and the second display window image IMGW2 to the display device 34. The display device 34 displays the first display window image IMGW1 on the first display window 70 and displays the second display window image IMGW2 on the second display window 72.

The image processing unit 22 comprises a display change operation reception portion 420 and an image change parameter generation portion 422. The display change operation reception portion 420 receives a display change operation input by using the input device 32 or the like shown in FIG. 1. The display change operation reception portion 420 outputs a change parameter PAR representing the content of the display change.

The image change parameter generation portion 422 acquires the change parameter PAR output from the display change operation reception portion 420 and generates a first image change parameter PAR1 to be applied to the change of the first display window image IMGW1 from the change parameter PAR. In addition, the image change parameter generation portion 422 generates a second image change parameter PAR2 to be applied to the change of the second display window image IMGW2 from the change parameter PAR.

As the first image change parameter PAR1, a magnification ratio in a case of changing the magnification of the first display window image IMGW1 can be applied. The magnification ratio may be an enlargement ratio in a case of enlargement or a reduction ratio in a case of reduction.

The first image change parameter PAR1 may be a moving distance in a case of position change in which a position of the first display window image IMGW1 is moved, or may be a coordinate value representing a position of the first display window image IMGW1 after the movement.

Similarly, as the second image change parameter PAR2, a magnification ratio in a case of changing the magnification of the second display window image IMGW2 can be applied. The second image change parameter PAR2 may be a moving distance in a case of position change in which a position of the second display window image IMGW2 is moved, or may be a coordinate value representing a position of the second display window image IMGW2 after the movement.

In a case in which the magnification ratio in a case of changing the magnification of the first display window image IMGW1 is applied as the first image change parameter PAR1, the second image change parameter PAR2 is the magnification ratio in a case of changing the magnification of the second display window image IMGW2 and the same magnification ratio as the first image change parameter PAR1 is applied. The same applies to the change of the position.

That is, the image change parameter generation portion 422 generates the first image change parameter PAR1 and the second image change parameter PAR2 with which the second display window image IMGW2 is operated in conjunction with the operation on the first display window image IMGW1.

In addition, the image change parameter generation portion 422 generates the first image change parameter PAR1 and the second image change parameter PAR2 with which the first display window image IMGW1 is operated in conjunction with the operation on the second display window image IMGW2.

Operation and Effect of First Embodiment

According to the inspection device and the image display method according to the first embodiment, the transmission image IMG and the information on the defect region DA are not mixed with each other, and the correspondence between the transmission image IMG and the defect region DA can be easily confirmed. As a result, based on good visibility of both, in the monochrome display device 34, the adaptive shape of the defect region DA can be utilized, and the efficiency of the inspection work is improved.

The image processing unit 22 shown in FIG. 13 may execute an image display method including steps corresponding to the functions of the respective portions. For example, the image processing unit 22 can execute an image display method including a step of receiving the transmission image IMG, a step of receiving the defect region DA, a step of generating the defect region image IMGD based on the defect region DA, a step of displaying the first display window image IMGW1 based on the transmission image IMG on the first display window 70, a step of displaying the second display window image IMGW2 based on the defect region image IMGD on the second display window 72, and a step of linking the first display window image IMGW1 and the second display window image IMGW2 to each other. The steps corresponding to the functions of the respective portions in second to tenth embodiments described below can be included in the above-described image display method.

The inspection target OBJ described in the embodiment is an example of the processing target. The transmission image IMG described in the embodiment is an example of the processing target image. The display device 34 described in the embodiment is an example of the first display device. The first display window 70 described in the embodiment is an example of the first region. The second display window 72 is an example of the second region.

The defect region DA described in the embodiment is an example of the region-of-interest. The defect region image IMGD described in the embodiment is an example of the region-of-interest image in which the position of the region-of-interest and the form of the region-of-interest in the processing target image are reproduced.

The display change operation input by using the input device 32 or the like described in the embodiment is an example of the processing target image operation command, and is an example of the region-of-interest image operation command. The first image change parameter PAR1 described in the embodiment is an example of the processing target image change command. The second image change parameter PAR2 described in the embodiment is an example of the region-of-interest image change command.

Second Embodiment

Figure 14:
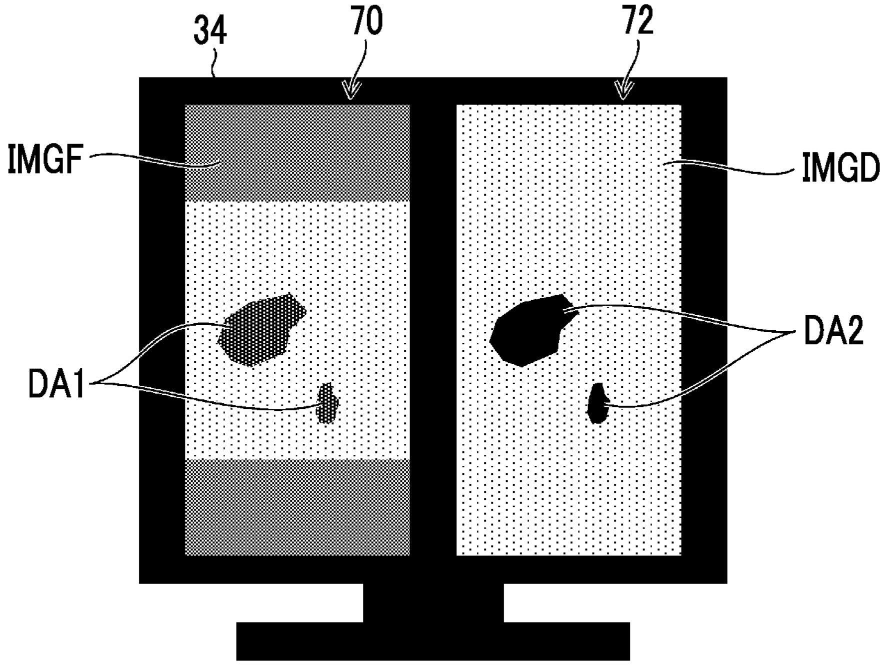
FIG. 14 is a schematic view of a screen to which an image display method according to a second embodiment is applied.

In a second embodiment, differences from the first embodiment will be mainly described, and common points with the first embodiment will be appropriately omitted. FIG. 14 is a schematic view of a screen to which an image display method according to the second embodiment is applied. In the image display method according to the second embodiment, a frequency selection image IMGF is displayed on the first display window 70 instead of the transmission image IMG.

Figure 15:
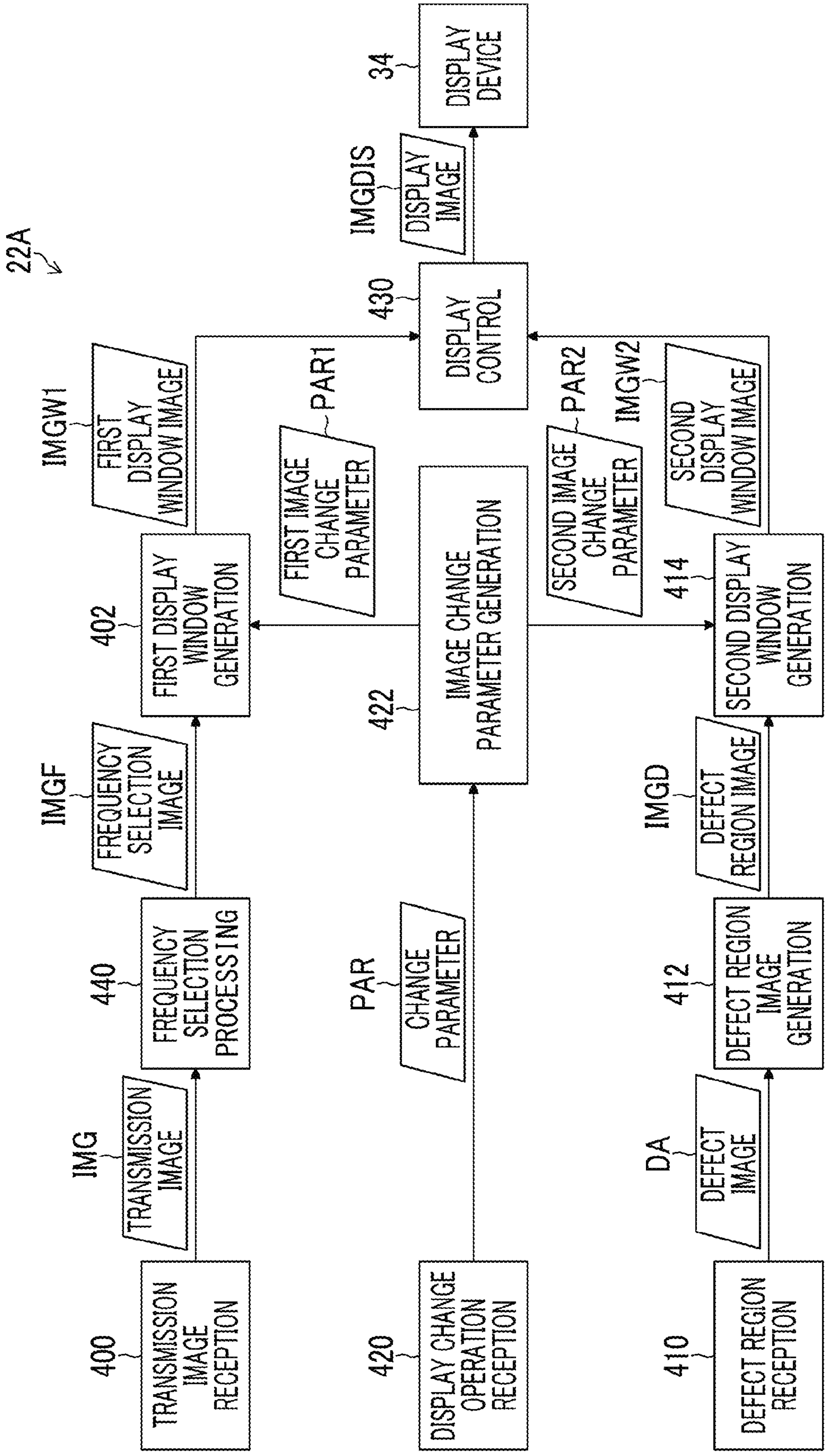
FIG. 15 is a functional block diagram showing an electric configuration of an image processing unit applied to an inspection device according to the second embodiment.

FIG. 15 is a functional block diagram showing an electric configuration of an image processing unit applied to an inspection device according to the second embodiment. An image processing unit 22A shown in FIG. 15 comprises a frequency selection processing portion 440. The frequency selection processing portion 440 performs frequency selection processing on the transmission image IMG acquired via the transmission image reception portion 400 to generate the frequency selection image IMGF.

The first display window generation portion 402 changes the frequency selection image IMGF to a format for display on the first display window 70 shown in FIG. 12 and outputs the frequency selection image IMGF as a first display window image IMGW1. The display device 34 displays the frequency selection image IMGF as the first display window image IMGW1 on the first display window 70.

Instead of the transmission image reception portion 400 and the frequency selection processing portion 440 shown in FIG. 15, a frequency selection image reception portion that receives the frequency selection image IMGF may be provided, and the frequency selection image IMGF generated outside the inspection device 20 may be acquired.

Operation and Effect of Second Embodiment

According to the inspection device and the image display method according to the second embodiment, a frequency selection image having better visibility than the transmission image IMG is displayed on the first display window 70 instead of the transmission image IMG. As a result, the visibility of the defect region DA1 displayed on the first display window 70 can be improved.

Third Embodiment

Figure 16:
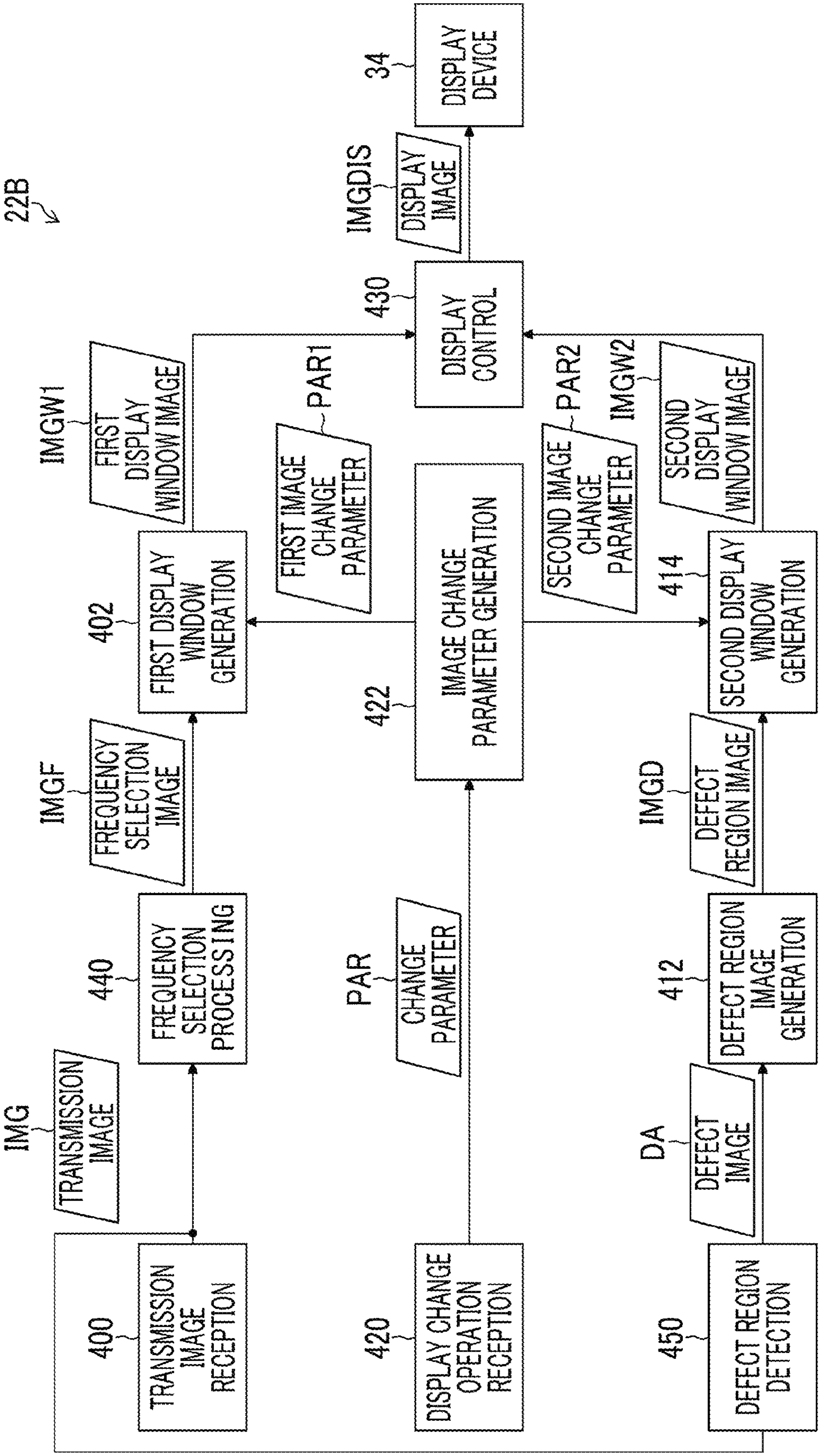
FIG. 16 is a functional block diagram showing an electric configuration of an image processing unit applied to an inspection device according to a third embodiment.

In a third embodiment, differences from the second embodiment will be mainly described, and common points with the second embodiment will be appropriately omitted. FIG. 16 is a functional block diagram showing an electric configuration of an image processing unit applied to an inspection device according to the third embodiment. An image processing unit 22B shown in FIG. 16 comprises a defect region detection portion 450 instead of the defect region reception portion 410 shown in FIG. 15.

The defect region detection portion 450 performs defect detection processing on the transmission image IMG acquired via the transmission image reception portion 400 to automatically detect the defect region DA. The defect region detection portion 450 can apply region detection processing such as segmentation to execute defect detection processing.

In addition, a trained learning model can be applied to the defect region detection portion 450. The learning model applied to the defect region detection portion 450 executes learning using a set of the input image of the defect region detection portion 450 and the detection result of the defect region DA as learning data. Examples of the learning model include a deep learning model such as a convolutional neural network (CNN).

The learning model applied to the defect region detection portion 450 described in the embodiment is an example of the first learning model. The result of automatically detecting the defect region DA described in the embodiment is an example of the result of automatically detecting the region-of-interest.

Operation and Effect of Third Embodiment

According to the inspection device and the image display method according to the third embodiment, it is not necessary to acquire information on the defect region DA of the transmission image IMG, and only the transmission image IMG can be used as an input. The defect region detection portion 450 may automatically detect the defect region DA from the frequency selection image IMGF.

Fourth Embodiment

Figure 17:
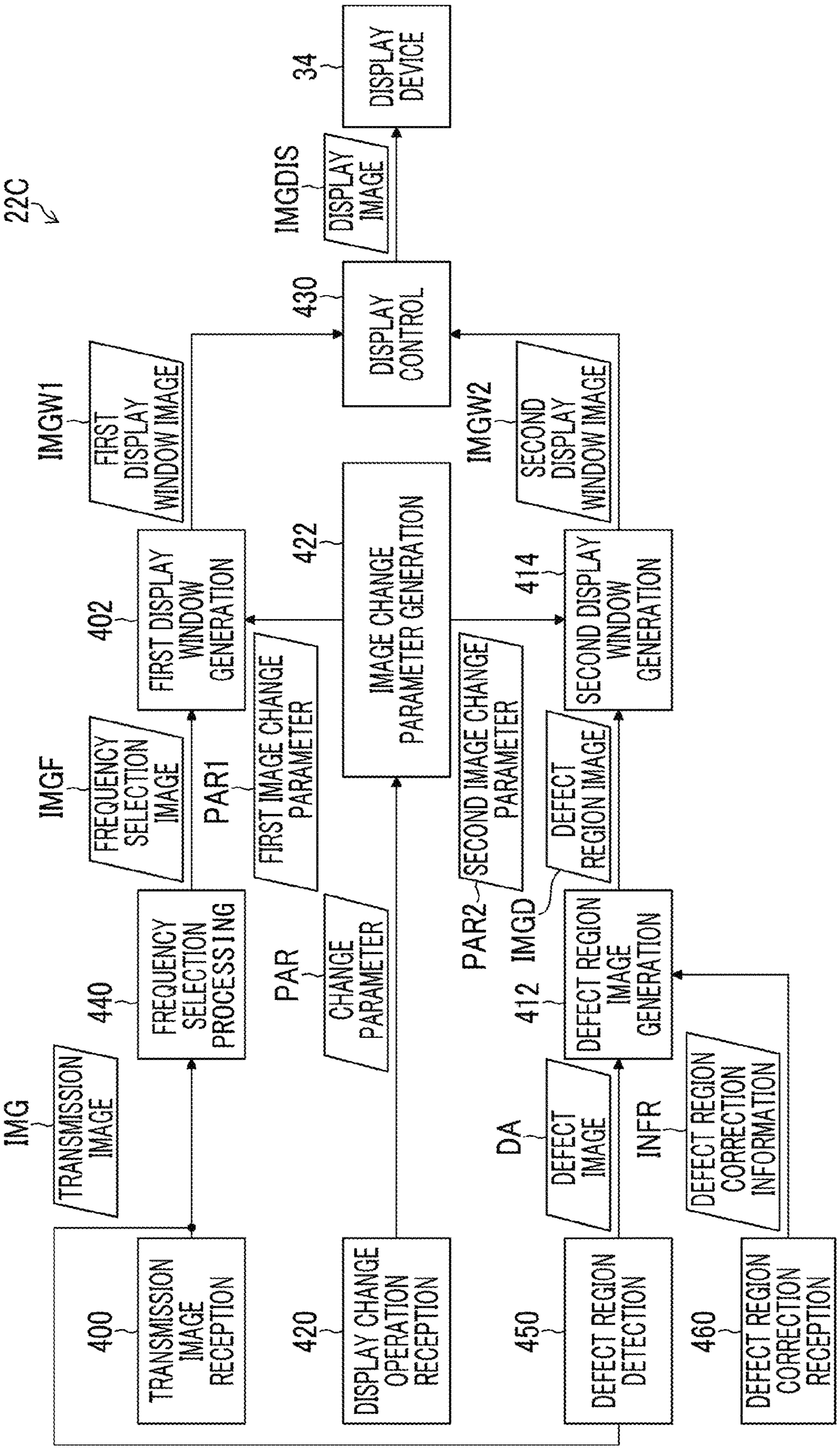
FIG. 17 is a functional block diagram showing an electric configuration of an image processing unit applied to an inspection device according to a fourth embodiment.

In a fourth embodiment, differences from the third embodiment will be mainly described, and common points with the second embodiment will be appropriately omitted. FIG. 17 is a functional block diagram showing an electric configuration of an image processing unit applied to an inspection device according to the fourth embodiment. In an image processing unit 22C shown in FIG. 17, a defect region correction reception portion 460 is added to the image processing unit 22B shown in FIG. 16.

The defect region correction reception portion 460 receives correction for the defect region image IMGD input by the inspection operator by using the input device 32 shown in FIG. 1. That is, the defect region correction reception portion 460 transmits defect region correction information INFR to the defect region image generation portion 412.

The defect region image generation portion 412 corrects the defect region image IMGD based on the defect region correction information INFR. The second display window 72 of the display device 34 displays the second display window image IMGW2 corresponding to the manually corrected defect region image IMGD.

Operation and Effect of Fourth Embodiment

According to the inspection device and the image display method according to the fourth embodiment, the inspection operator can correct an error of the defect region DA automatically detected from the transmission image IMG.

Fifth Embodiment

Figure 18:
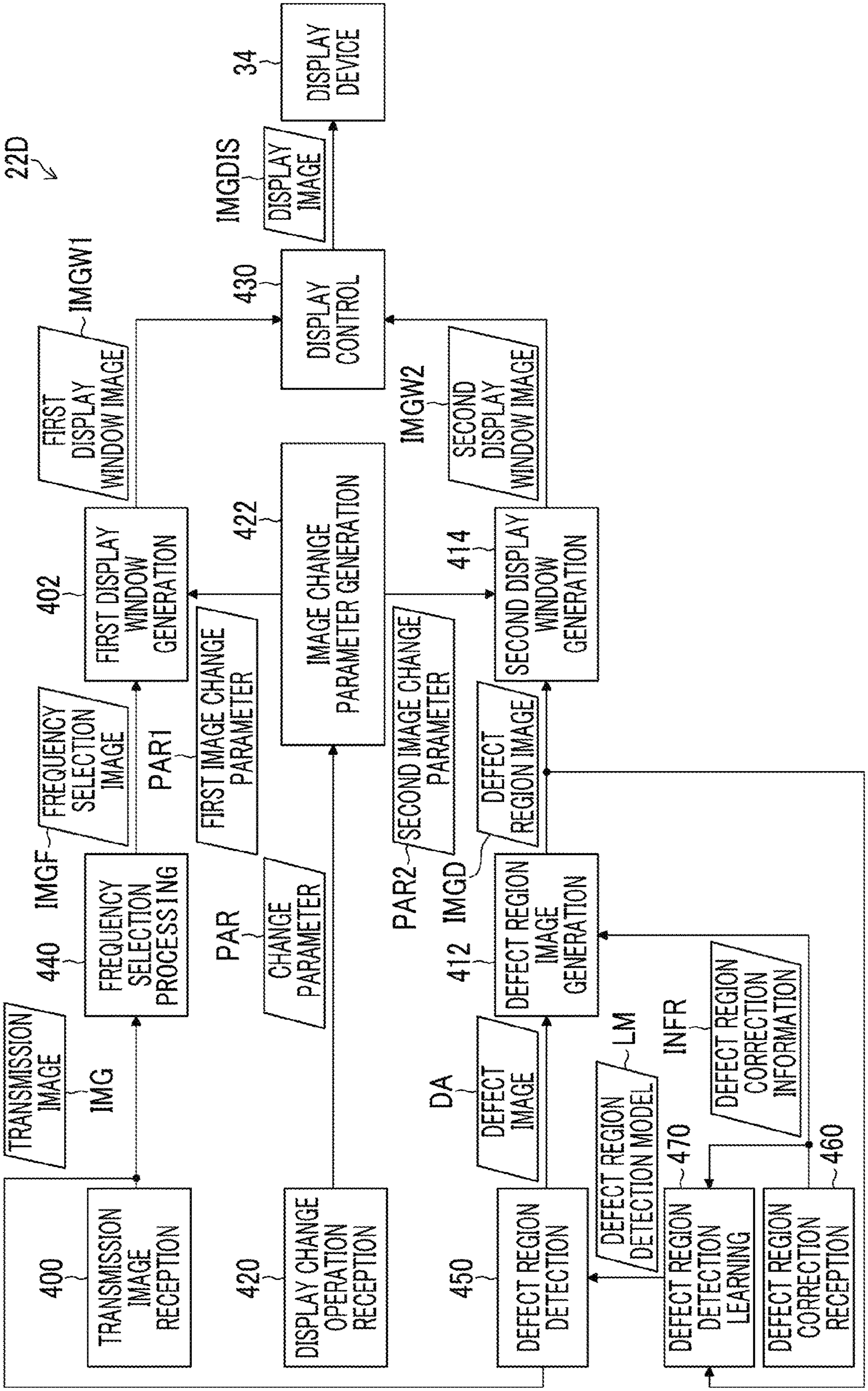
FIG. 18 is a functional block diagram showing an electric configuration of an image processing unit applied to an inspection device according to a fifth embodiment.

FIG. 18 is a functional block diagram showing an electric configuration of an image processing unit applied to an inspection device according to a fifth embodiment. In an image processing unit 22D shown in FIG. 18, a defect region detection learning portion 470 is added to the image processing unit 22C shown in FIG. 17.

The image processing unit applied to the inspection device according to the fifth embodiment uses the result of the correction of the defect region DA executed by the inspection operator as teacher data in machine learning. The defect region detection learning portion 470 uses a set of the defect region correction information INFR representing the correction of the defect region DA executed by the inspection operator and the defect region image IMGD obtained as the result of the correction, as learning data.

As a method of automatically detecting the defect region DA applied to the defect region detection portion 450, a machine learning method such as a segmentation model to which deep learning is applied, which is disclosed in "Long, Jonathan, Evan Shelhamer, and Trevor Darrell. "Fully convolutional networks for semantic segmentation. "Proceedings of the IEEE conference on computer vision and pattern recognition. 2015" is assumed.

As an example of the deep learning applied to the defect region detection learning portion 470, a convolutional neural network is used. The learning model applied to the defect region detection learning portion 470 described in the embodiment is an example of the second learning model.

The defect region detection portion 450 can apply a trained defect region detection model LM, which has been trained in the defect region detection learning portion 470, to automatically detect the defect region DA. In the present embodiment, the image processing unit 22D provided with the defect region detection learning portion 470 is illustrated, but the defect region detection learning portion 470 may be a constituent element that is independent of the image processing unit 22D.

Operation and Effect of Fifth Embodiment

According to the inspection device and the image display method according to the fifth embodiment, it is possible to improve the accuracy of the automatic detection of the defect region through normal inspection work.

Sixth Embodiment

Figure 19:
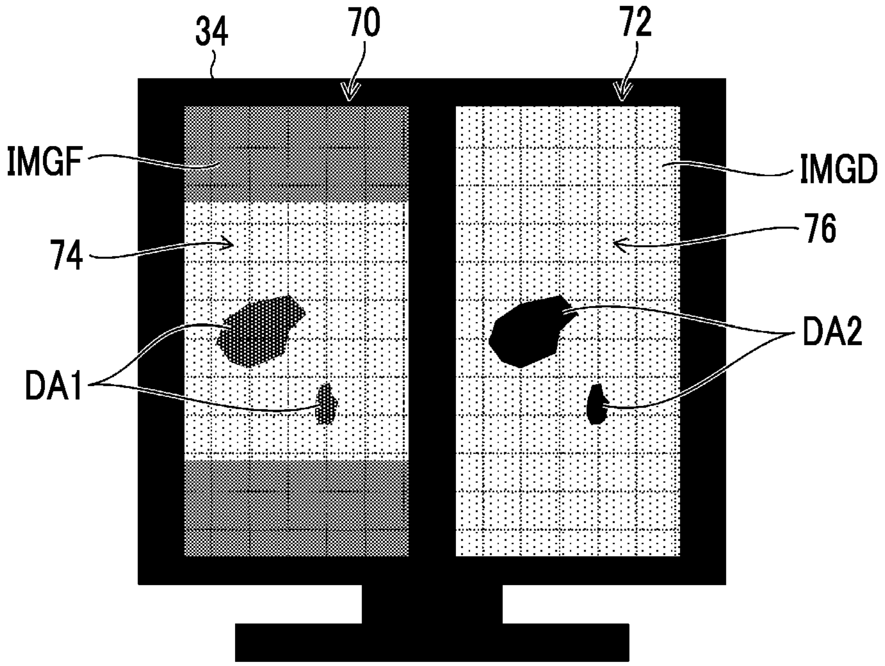
FIG. 19 is a schematic view of a screen to which an image display method according to a sixth embodiment is applied.

FIG. 19 is a schematic view of a screen to which an image display method according to a sixth embodiment is applied. A grid 74 indicating a position is displayed on the first display window 70 shown in FIG. 19, and a grid 76 indicating a position is displayed on the second display window 72 in conjunction with the display of the grid 74 of the first display window 70.

That is, the same pitch and the same line type are applied to the grid 74 that is superimposed and displayed on the frequency selection image IMGF in the first display window 70 and the grid 76 that is superimposed and displayed on the defect region image IMGD in the second display window 72. The type of the line may include a line type and a line width.

Operation and Effect of Sixth Embodiment

With the inspection device and the image display method according to the sixth embodiment, the inspection operator can efficiently confirm corresponding positions between the frequency selection image IMGF and the defect region image IMGD by using the grid 74 superimposed and displayed on the frequency selection image IMGF and the grid 76 superimposed and displayed on the defect region image IMGD.

Seventh Embodiment

Figure 20:
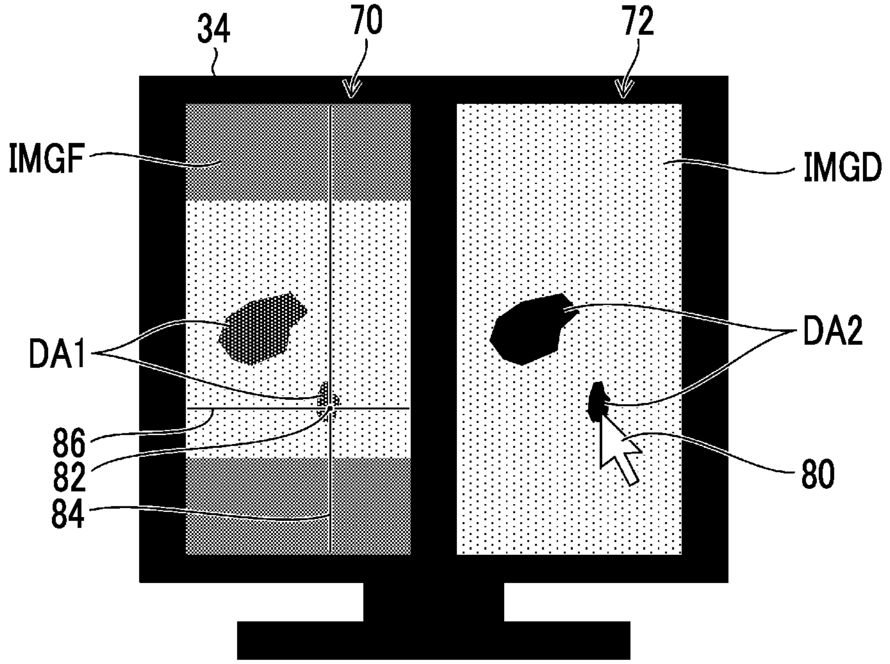
FIG. 20 is a schematic view of a screen to which an image display method according to a seventh embodiment is applied.

FIG. 20 is a schematic view of a screen to which an image display method according to a seventh embodiment is applied. In the image display method according to the seventh embodiment, mouse hover with respect to any one of the first display window 70 or the second display window 72 is received, a position of the mouse hover is detected, and a marker is displayed at a corresponding position with respect to the other display window. The reception of the mouse hover may be performed in the first display window or in the second display window 72.

FIG. 20 shows the display device 34 in which mouse hover of placing the mouse cursor 80 over the defect region DA2 of the second display window 72 is received and a marker 82 is displayed at a corresponding position in the first display window 70 with respect to the position of the mouse hover in the second display window 72.

That is, the display change operation reception portion 420 shown in FIG. 15 receives the mouse hover, and the image change parameter generation portion 422 detects the position of the mouse hover with respect to the second display window 72 to acquire positional information of the mouse hover.

The second display window generation portion 414 generates the second display window image IMGW2 in which the mouse cursor 80 is superimposed and displayed on the defect region image IMGD based on the positional information of the mouse hover. In addition, the first display window generation portion 402 generates the first display window image IMGW1 in which the position of the mouse hover with respect to the second display window 72 is duplicated and the marker 82 is superimposed and displayed on the frequency selection image IMGF. As the position of the mouse hover, a position in unit of a pixel can be applied.

FIG. 20 illustrates an aspect in which an intersection of a line segment 84 and a line segment 86 orthogonal to each other is used as the marker 82, but the marker 82 is not limited to the aspect illustrated in FIG. 20, and various aspects may be applied.

The mouse hover is an operation of placing a mouse cursor over a target, and may be referred to as mouse-on and roll over. In addition, the mouse cursor may be referred to as a mouse pointer or the like.

Modification Example of Seventh Embodiment

Figure 21:
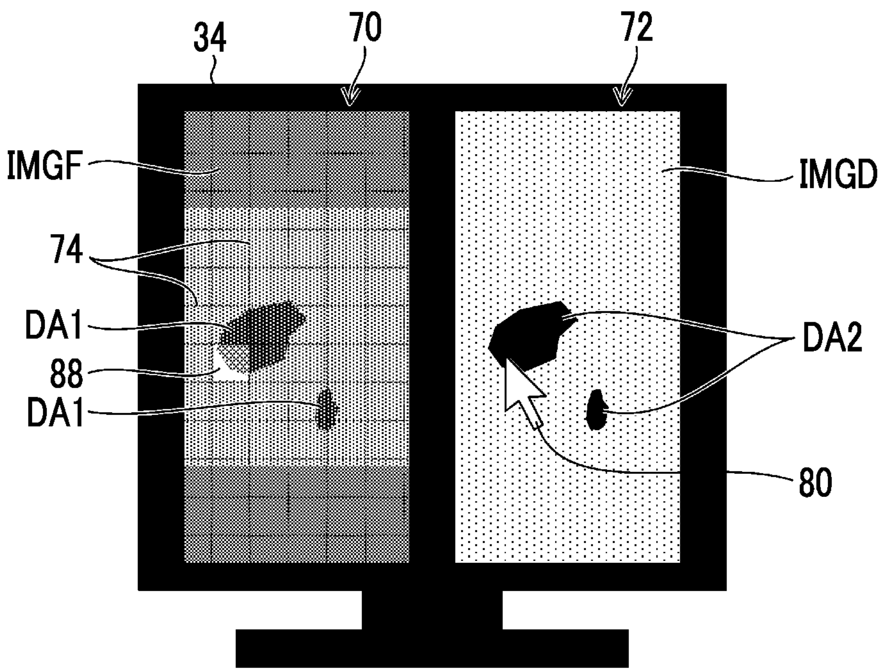
FIG. 21 is a schematic view of a screen to which an image display method according to a modification example of the seventh embodiment is applied.

FIG. 21 is a schematic view of a screen to which an image display method according to a modification example of the seventh embodiment is applied. In FIG. 21, instead of the display of the marker 82 shown in FIG. 20, a pixel 88 in the first display window 70 corresponding to a pixel position of the mouse cursor 80 in the second display window 72 is highlighted.

Specifically, pixel values of pixels other than the pixel 88 are lowered to be darken, and the pixel 88 is highlighted. The pixel values of all the pixels other than the pixel 88 may be lowered, or the brightness of the pixels around the pixel 88 may be lowered. In general, the monochrome display device 34 is used for displaying the frequency selection image IMGF. In this case, in a case in which the pixel value of the pixel 88 at the corresponding position is changed, the original information of the pixel 88 may be lost. Therefore, the pixel values of the pixels other than the pixel 88 are lowered, whereby the inspection operator can confirm the pixel 88 at the corresponding position without losing the original information of the pixel 88.

Operation and Effect of Seventh Embodiment

According to the inspection device and the image display method according to the seventh embodiment, the complexity of information such as the grid display can be avoided, and the inspection operator can efficiently confirm the corresponding positions between the first display window 70 and the second display window 72.

The process of highlighting the pixel 88 in the first display window 70 corresponding to the pixel position of the mouse cursor 80 in the second display window 72 described in the embodiment is an example of the emphasis processing to emphasize a position in the other corresponding to the position designated in the one.

The mouse hover of placing the mouse cursor 80 over the defect region DA2 of the second display window 72 described in the embodiment is an example of the position designation operation for designating a position on one of the processing target image or the region-of-interest image.

Eighth Embodiment

Figure 22:
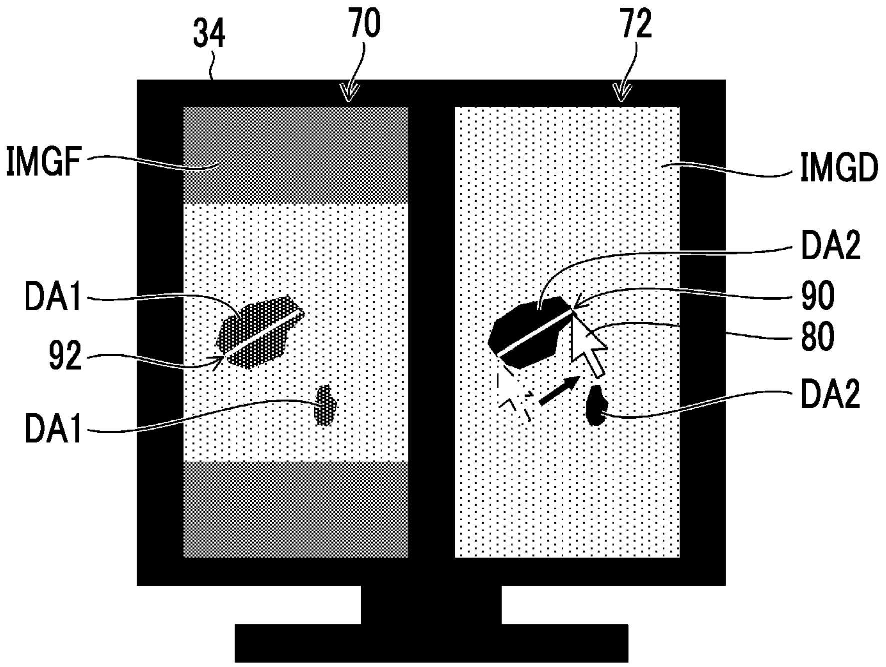
FIG. 22 is a schematic view of a screen to which an image display method according to an eighth embodiment is applied.

FIG. 22 is a schematic view of a screen to which an image display method according to an eighth embodiment is applied. In the image display method according to the eighth embodiment, a ruler operation on one of the first display window 70 or the second display window 72 is detected, and the ruler operation on the one display window is duplicated on the other display window. The ruler operation may be detected in the first display window 70 or in the second display window 72.

FIG. 22 shows the display device 34 in which the ruler operation of measuring the maximum length of the defect region DA2 of the second display window 72 is detected and the ruler operation with respect to the second display window 72 is duplicated on the first display window 70.

That is, the display change operation reception portion 420 shown in FIG. 15 receives the ruler operation on the defect region DA2 of the second display window 72, and the image change parameter generation portion 422 acquires positional information of a line segment 90 obtained as the result of the ruler operation on the second display window 72.

The second display window generation portion 414 generates the second display window image IMGW2 in which the line segment 90 is superimposed and displayed on the defect region image IMGD based on the positional information of the line segment 90. In addition, the first display window generation portion 402 generates the first display window image IMGW1 in which the line segment 90 with respect to the second display window 72 is duplicated and a line segment 92 is superimposed and displayed on the frequency selection image IMGF.

FIG. 22 illustrates an operation of drawing the line segment 90 with respect to the defect region DA2 as an example of the ruler operation of measuring the maximum length of the defect region DA2. The mouse cursor 80 shown by a broken line is shown in a state of being placed at a start point of the line segment 90. The mouse cursor 80 shown by a solid line is shown in a state of being placed at an end point of the line segment 90.

Modification Example of Eighth Embodiment

Figure 23:
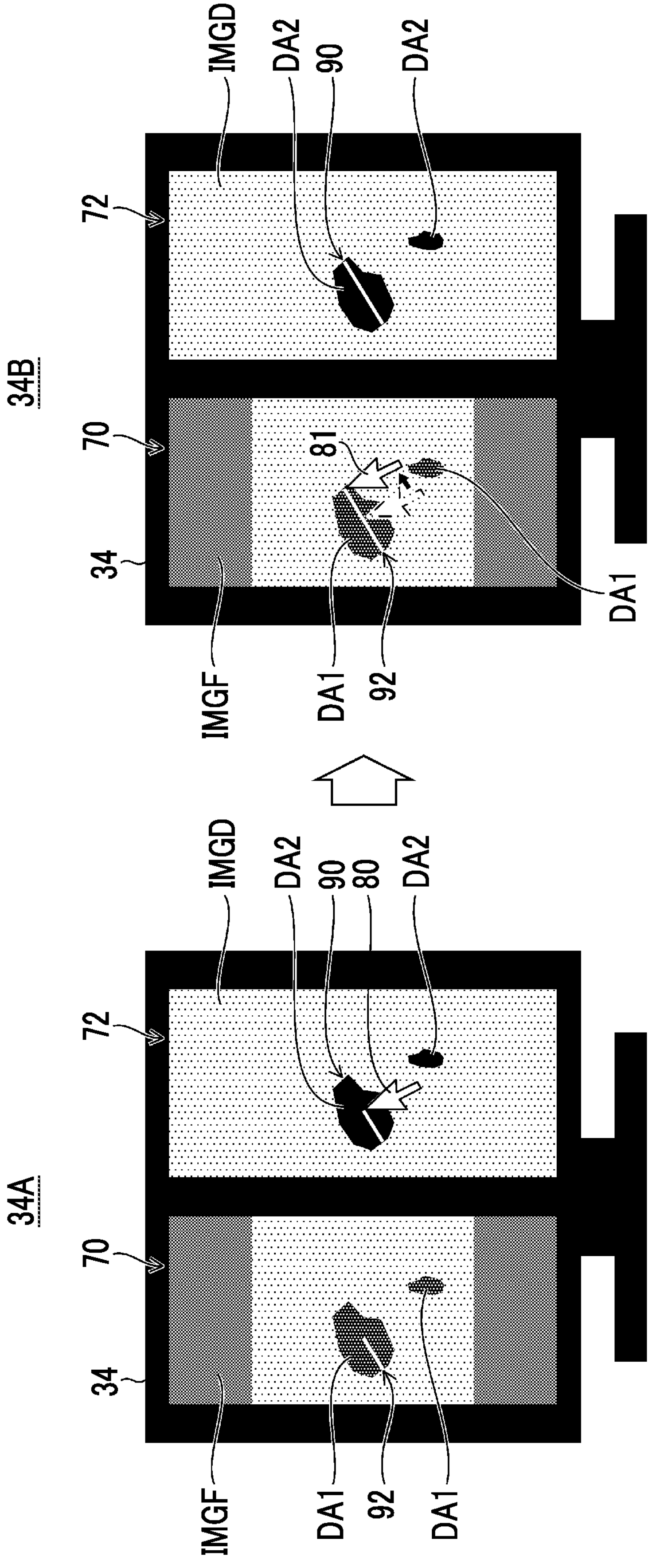
FIG. 23 is a schematic view of a screen to which an image display method according to a modification example of the eighth embodiment is applied.

FIG. 23 is a schematic view of a screen to which an image display method according to a modification example of the eighth embodiment is applied. In a case in which the ruler operation on one of the first display window 70 or the second display window 72 is interrupted, the ruler operation may be taken over on the other display window.

Reference numeral 34A shown in FIG. 23 indicates a state where the ruler operation on the second display window 72 is interrupted. Reference numeral 34B indicates a state where the ruler operation on the second display window 72 is taken over to the ruler operation with respect to the first display window 70.

In a case in which the ruler operation on the second display window 72 is taken over to the ruler operation on the first display window 70, the mouse cursor 81 is displayed in the first display window 70, and the mouse cursor 80 of the second display window 72 is not displayed. The mouse cursor 81 shown by a broken line is the mouse cursor 81 at a time point at which the ruler operation is taken over.

That is, the display change operation reception portion 420 shown in FIG. 15 receives the interruption of the ruler operation on the second display window 72. The image change parameter generation portion 422 acquires the positional information of the line segment 90 that is drawn halfway in the second display window 72.

The second display window generation portion 414 generates the second display window image IMGW2 in which the line segment 90 is superimposed and displayed on the defect region image IMGD based on the positional information of the line segment 90. In addition, the first display window generation portion 402 generates the first display window image IMGW1 in which the line segment 90 in the second display window 72 is duplicated and a line segment 92 is superimposed and displayed on the frequency selection image IMGF.

In addition, the display change operation reception portion 420 receives the ruler operation on the taken-over first display window 70. The image change parameter generation portion 422 acquires the positional information of the line segment 92. The first display window generation portion 402 generates the first display window image IMGW1 in which the line segment 92 is superimposed and displayed on the frequency selection image IMGF based on the positional information of the line segment 92. In addition, the second display window generation portion 414 generates the second display window image IMGW2 in which the line segment 92 in the first display window 70 is duplicated and the line segment 90 is superimposed and displayed on the defect region image IMGD.

Operation and Effect of Eighth Embodiment

According to the inspection device and the image display method according to the eighth embodiment, more accurate evaluation of the actual size, the shape characteristic, and the like of the defect DE can be executed based on good visibility.

Ninth Embodiment

Figure 24:
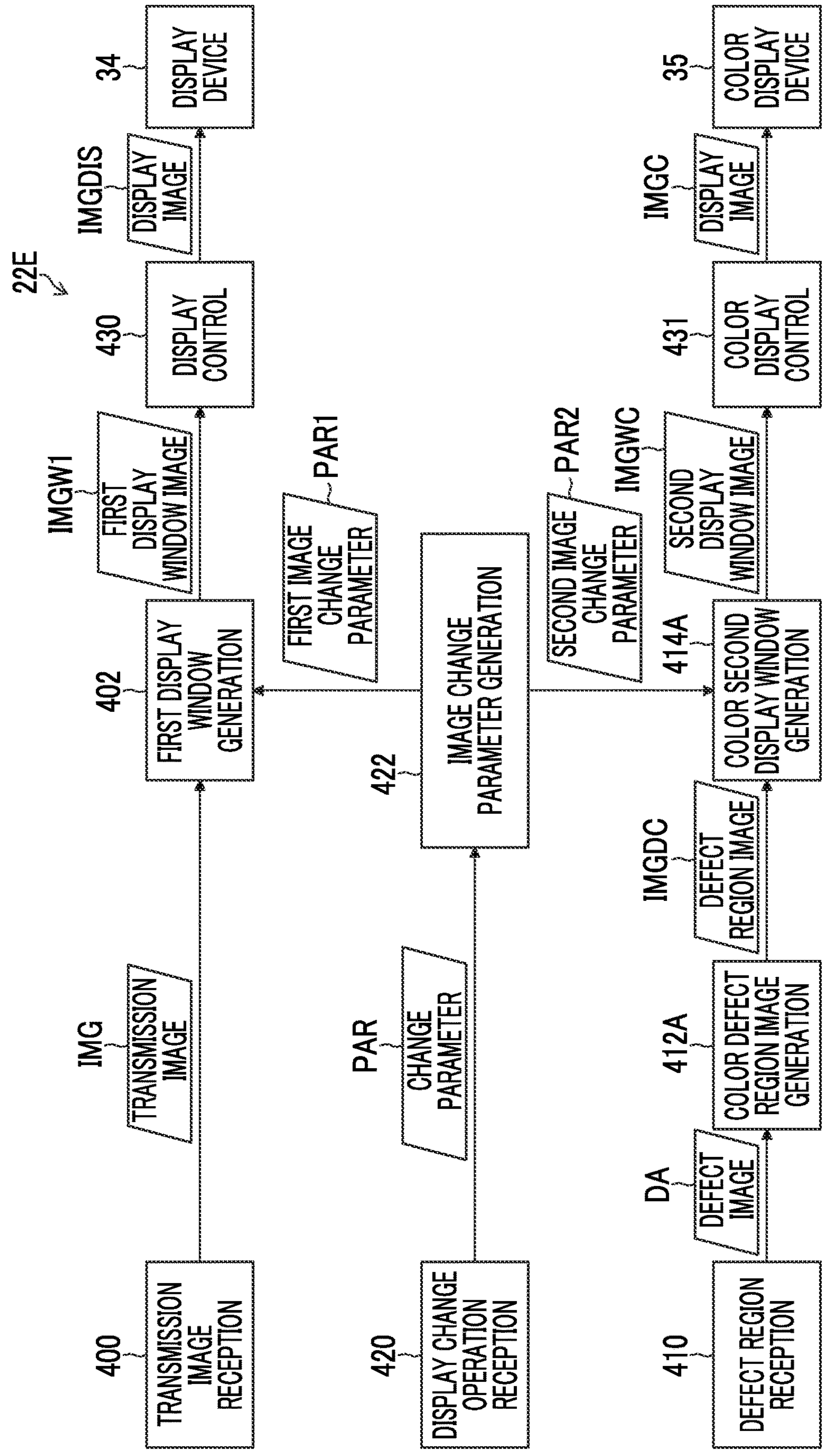
FIG. 24 is a functional block diagram showing an electric configuration of an image processing unit applied to an inspection device according to a ninth embodiment.

FIG. 24 is a functional block diagram showing an electric configuration of an image processing unit applied to an inspection device according to a ninth embodiment. The inspection device according to the ninth embodiment displays the defect region image IMGD in color. A color defect region image IMGDC utilizing color information is generated based on the defect region DA. As the color defect region image IMGDC, an aspect in which the type of the defect, the severity of defect, and the like are color-coded can be adopted.

An image processing unit 22E shown in FIG. 24 comprises a color defect region image generation portion 412A instead of the defect region image generation portion 412, comprises a color second display window generation portion 414A instead of the second display window generation portion 414, and further comprises a color display control portion 431, with respect to the image processing unit 22 shown in FIG. 13.

The color defect region image generation portion 412A generates the color defect region image IMGDC. RGB can be applied to representation of the color. R in RGB represents red, G represents green, and B represents blue.

The color second display window generation portion 414A generates a color second display window image IMGWC. The color display control portion 431 generates a display signal representing a color display image IMGC based on the color second display window image IMGWC, and transmits the display signal representing the color display image IMGC to a color display device 35. The color display device 35 displays the color display image IMGC.

The transmission image IMG or the frequency selection image IMGF is generated as a monochrome grayscale image, is displayed on the monochrome display device 34, and only the color defect region image IMGDC is displayed on the color display device 35.

In other words, a monochrome grayscale is applied to the first display window 70 and is displayed on the display device 34. A color is applied to the second display window 72 and is displayed on the color display device 35. The first display window 70 and the second display window 72 are linked to each other as in the first to eighth embodiments described above.

[Operation and Effect of Ninth Embodiment]

According to the inspection device and the image display method according to the ninth embodiment, in the defect region image, the defect type, the defect severity, and the like can be confirmed by using the color information, and the efficiency of the inspection work is improved. In addition, in a case in which the color display device is used for normal work such as creating a report, smooth work collaboration between the normal work such as creating a report and the inspection work is realized.

The color display device 35 described in the embodiment is an example of the second display device. The monochrome grayscale image displayed on the monochrome display device 34 described in the embodiment is an example of the display in grayscale.

Tenth Embodiment

Figure 25:
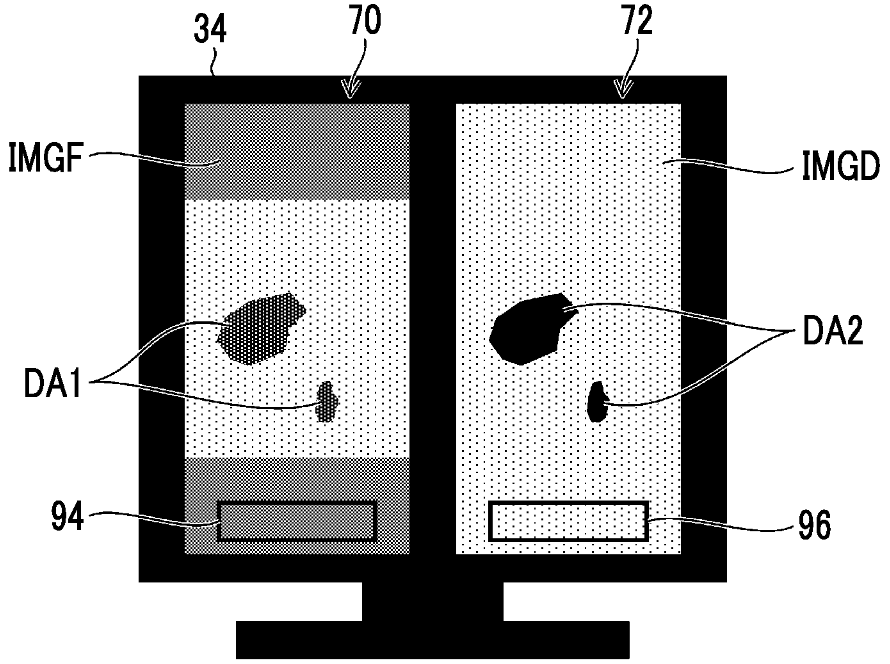
FIG. 25 is a schematic view of a screen to which an image display method according to a tenth embodiment is applied.

FIG. 25 is a schematic view of a screen to which an image display method according to a tenth embodiment is applied. In the image display method according to the tenth embodiment, the defect region image IMGD is generated for each type of defect DE, and the second display window 72 in which the defect region image IMGD is displayed displays information representing the type of the defect DE.

In the second display window 72 shown in FIG. 25, a defect type information display region 96 for displaying the information representing the type of the defect DE is set. As a display form of the information representing the type of the defect DE, a character, a symbol, an image, or the like can be applied. Examples of the character representing the type of the defect DE include character information representing a name of the type of the defect DE and character information representing an abbreviation of the type of the defect DE.

In a case in which the color defect region image IMGDC is displayed on the color display device 35, color information can be applied as the information representing the type of the defect DE.

FIG. 25 illustrates an aspect in which the defect type information display region 94 is also set in the first display window 70 in correspondence with the defect type information display region 96 of the second display window 72. The defect type information display region 94 can display information representing the same type of the defect DE as the defect type information display region 96.

A button or the like for selecting the type of the defect may be displayed on at least any of the first display window 70 or the second display window 72, and the defect of the type selected in response to an operation of the button or the like may be displayed on the display device 34.

Operation and Effect of Tenth Embodiment

According to the inspection device and the image display method according to the tenth embodiment, the inspection operator can understand the type of the defect DE at a glance from the defect type information display region 96.

[Hardware Configuration of Inspection Device]

Figure 26:
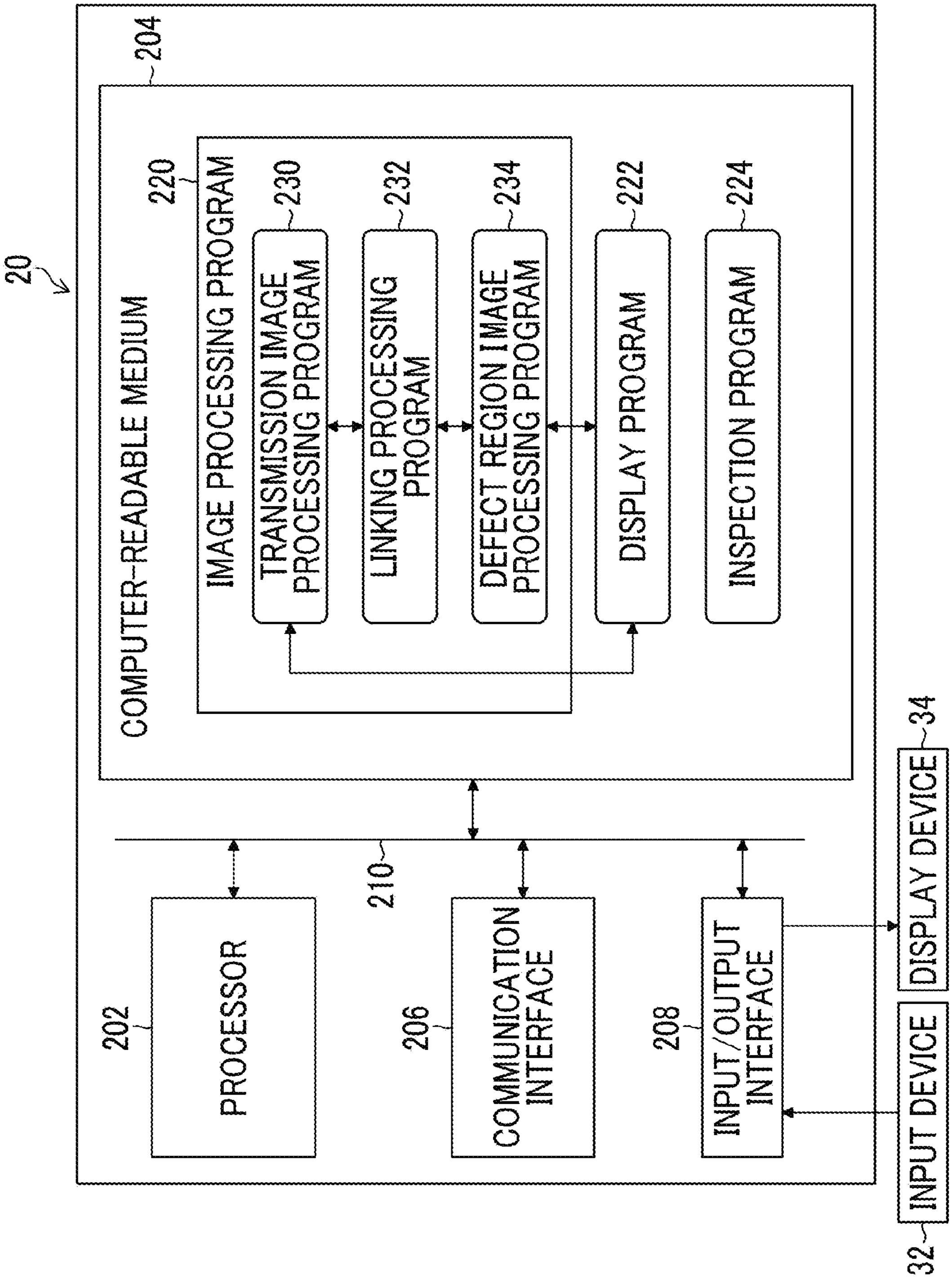
FIG. 26 is a block diagram showing a configuration example of hardware of the inspection device according to the embodiment.

FIG. 26 is a block diagram showing a configuration example of hardware of the inspection device according to the embodiment. The inspection device 20 comprises a processor 202, a computer-readable medium 204 that is a non-transitory tangible object, a communication interface 206, and an input/output interface 208.

The processor 202 comprises a CPU which is a general-purpose processing device. The processor 202 may comprise a graphics processing unit (GPU) which is a processing device specialized in image processing.

The processor 202 is connected to the computer-readable medium 204, the communication interface 206, and the input/output interface 208 via a bus 210. The input device 32 and the display device 34 are connected to the bus 210 via the input/output interface 208.

The computer-readable medium 204 comprises a memory which is a main memory and a storage which is an auxiliary memory. A semiconductor memory, a hard disk apparatus, a solid state drive apparatus, and the like can be applied as the computer-readable medium 204. Any combination of a plurality of devices can be applied as the computer-readable medium 204.

The hard disk apparatus can be referred to as an HDD which is an abbreviation for Hard Disk Drive in English. The solid state drive apparatus can be referred to as an SSD which is an abbreviation for Solid State Drive in English.

The inspection device 20 is connected to a network via the communication interface 206, and is communicably connected to an external device. A local area network (LAN) and the like can be used as the network. In FIG. 26, the network is not shown.

The computer-readable medium 204 stores an image processing program 220, a display program 222, and an inspection program 224. The computer-readable medium 204 may store a storage processing program and the like related to storing various kinds of data.

The image processing program 220 is applied to various kinds of image processing in the image processing unit 22 and the like shown in FIG. 13, and is a program for realizing various functions of the image processing unit 22 and the like. The image processing program 220 includes a transmission image processing program 230, a linking processing program 232, and a defect region image processing program 234.

The transmission image processing program 230 is applied to a process of generating the first display window image IMGW1 from the transmission image IMG or the frequency selection image IMGF, and mainly realizes the function of the first display window generation portion 402. The transmission image processing program 230 may be applied to a process of generating the frequency selection image IMGF and may realize the function of the frequency selection processing portion 440.

The linking processing program 232 is applied to a process of linking the first display window image IMGW1 and the second display window image IMGW2 to each other, and mainly realizes the function of the image change parameter generation portion 422.

The defect region image processing program 234 is applied to a process of generating the second display window image IMGW2 from the defect region image IMGD, and mainly realizes the function of the second display window generation portion 414.

The display program 222 is applied to the processing related to the display on the display device 34 and realizes the function of the display control portion 430. In addition, the display program 222 is applied to the processing related to the display of the color display device 35 shown in FIG. 24 and realizes the function of the color display control portion 431.

The inspection program 224 is applied to the processing related to the inspection processing unit 24 shown in FIG. 1 and realizes the function of the inspection processing unit 24.

Various programs stored in the computer-readable medium 204 include one or more commands. The computer-readable medium 204 stores various kinds of data, various parameters, and the like.

In the inspection device 20, the processor 202 executes various programs stored in the computer-readable medium 204 to realize various functions in the inspection device 20. The term "program" is synonymous with the term "software".

The inspection device 20 executes data communication with an external device via the communication interface 206. Various standards such as universal serial bus (USB) can be applied to the communication interface 206. As a communication form of the communication interface 206, either wired communication or wireless communication may be applied.

An input device 32 and a display device 34 are connected to the inspection device 20 via the input/output interface 208. An input device such as a keyboard or a mouse is applied as the input device 32. The display device 34 displays various kinds of information applied to the inspection device 20.

A liquid crystal display, an organic EL display, a projector, and the like can be applied as the display device 34. Any combination of a plurality of devices can be applied as the display device 34. The term "EL" of an organic EL display is an abbreviation for Electro-Luminescence.

Here, examples of a hardware structure of the processor 202 include a CPU, a GPU, a programmable logic device (PLD), and an application specific integrated circuit (ASIC). The CPU is a general-purpose processor that executes a program and acts as various functional units. The GPU is a processor specialized in image processing.

The PLD is a processor capable of changing a configuration of an electric circuit after manufacturing a device. An example of the PLD is a field programmable gate array (FPGA). The ASIC is a processor comprising a dedicated electric circuit specifically designed to execute a specific process.

One processing unit may be configured by one of these various processors or may be composed of two or more processors of the same type or different types. Examples of a combination of various processors include a combination of one or more FPGAs and one or more CPUs, and a combination of one or more FPGAs and one or more GPUs. Another example of a combination of various processors includes a combination of one or more CPUs and one or more GPUs.

A plurality of functional units may be configured by using one processor. As an example of configuring a plurality of functional units by using one processor, there is an aspect in which, as typified by a computer such as a client or a server, a combination of one or more CPUs and software such as a system on a chip (SoC) is applied to configured one processor, and the processor is caused to act as a plurality of functional units.

As another example of configuring a plurality of functional units by using one processor, there is an aspect in which a processor that realizes functions of an entire system including a plurality of functional units by using one IC chip is used.

As described above, the various functional units are configured by using one or more of the above described various processors as a hardware structure. Furthermore, the hardware structure of the above described various processors is, more specifically, an electric circuit (circuitry) in which circuit elements such as semiconductor elements are combined.

The computer-readable medium 204 may include a semiconductor element such as a read only memory (ROM) or a random access memory (RAM). The computer-readable medium 204 may include a magnetic storage medium such as a hard disk. The computer-readable medium 204 may be provided with a plurality of types of storage media.

An aspect of switching between a normal display mode and a multi-display mode can be applied to the inspection devices shown in the first to tenth embodiments. For example, the display mode may be switched in response to a display mode switching signal input by using the input device 32 shown in FIG. 1.

For example, in the normal display mode, only the transmission image IMG or the frequency selection image IMGF is displayed, and in the multi-display mode, the transmission image IMG or the frequency selection image IMGF is displayed on the first display window 70, and the defect region image IMGD is displayed on the second display window 72.

The normal display mode described in the embodiment is an example of the first display mode, and the multi-display mode is an example of the second display mode.

In the first to tenth embodiments, although the defect inspection device that inspects the defect of the industrial product has been described, any of the first to tenth embodiments can be applied to a processing device, such as an analysis device that analyzes, classifies, and evaluates the industrial product.

In addition, the image processing unit 22 and the like shown in the first to tenth embodiments have a hardware configuration shown in FIG. 26 and can be configured as an image processing apparatus that executes a program related to image processing and a program related to display.

The technical scope of the present invention is not limited to the scope described in the above embodiments. The configurations and the like in each embodiment can be appropriately combined between the respective embodiments without departing from the spirit of the present invention.

EXPLANATION OF REFERENCES

10: defect inspection system
20: inspection device
22: image processing unit
22A: image processing unit
22B: image processing unit
22C: image processing unit
22D: image processing unit
22E: image processing unit
32: input device
34: display device
34A: state where ruler operation is interrupted
34B: state where ruler operation is taken over
35: color display device
50: metal component
51: first component portion
52: second component portion
54: background
56: frame
58: contour line
60: metal component
61: first component portion
62: second component portion
64: background
70: first display window
72: second display window
74: grid
76: grid
80: mouse cursor
82: marker
84: line segment
86: line segment
88: pixel
90: line segment
92: line segment
94: defect type information display region
96: defect type information display region
100: imaging system
102: imaging control unit
104: imaging operation unit
106: image recording unit
108: camera
110: first radiation source
112: second radiation source
113: radiation source
114: imaging room
120: product database
202: processor
204: computer-readable medium
206: communication interface
208: input/output interface
210: bus
220: image processing program
222: image display program
224: inspection program
230: transmission image processing program
232: linking processing program
234: defect region image processing program
400: transmission image reception portion
402: first display window generation portion
410: defect region reception portion
412: defect region image generation portion
412A: color defect region image generation portion
414: second display window generation portion
414A: color second display window generation portion
420: display change operation reception portion
422: image change parameter generation portion
430: display control portion
431: color display control portion
440: frequency selection processing portion
450: defect region detection portion
460: defect region correction reception portion
470: defect region detection learning portion
D10: inspection data
D12: inspection target specification information
D14: inspection target measurement data
D16: defect candidate data
D18: diagnosis result data
D100: imaging data
D102: inspection target specification information
D104: captured image data
D106: imaging condition data
D108: illumination condition data D120: product data
D122: product specification information
D124: product attribute information
D126: inspection region designation information
DA: defect region
DA1: defect region
DA2: defect region
DA3: defect region
DE: defect
IMG: transmission image
IMG1: transmission image
IMG2: transmission image
IMG3: transmission image
IMGC: color display image
IMGD: defect region image
IMGDC: defect region image
IMGDIS: display image
IMGF: frequency selection image
IMGW1: first display window image
IMGW2: second display window image
IMGWC: second display window image
INFR: defect region correction information
LM: defect region detection model
NW: network
OBJ: inspection target
PAR: change parameter
PAR1: first image change parameter
PAR2: second image change parameter

What is claimed is:

1. An image processing apparatus comprising:
one or more processors,
wherein the one or more processors
acquire a processing target image generated by imaging a processing target,
display the processing target image on a first region of a first display device,
acquire a region-of-interest image in which a region-of-interest in the processing target is reproduced,
display the region-of-interest image on a second region different from the first region of the first display device, or display the region-of-interest image on a second display device different from the first display device,
operate one of the processing target image or the region-of-interest image in conjunction with an operation on the other,
receive a ruler operation on one of the processing target image or the region-of-interest image,
display a ruler operation on the other corresponding to the ruler operation on the one, in accordance with the ruler operation on the one, and
in a case where either one of the ruler operation on the processing target image and the ruler operation on the region-of-interest image is interrupted, cause the one of the ruler operation which is interrupted to be taken over as another of the ruler operation.

2. The image processing apparatus according to claim 1, wherein the one or more processors
acquire a transmission image generated based on a light ray or radiation transmitted through the processing target, as the processing target image, and
display the transmission image as the processing target image.

3. The image processing apparatus according to claim 1, wherein the one or more processors
acquire a transmission image generated based on a light ray or radiation transmitted through the processing target, as the processing target image,
generate a frequency selection image by performing frequency selection processing on the transmission image, and
display the frequency selection image as the processing target image.

4. The image processing apparatus according to claim 1, wherein the one or more processors
acquire a processing target image operation command representing an operation on the processing target image, and
operate the processing target image in accordance with the processing target image operation command, and operate the region-of-interest image in conjunction with the operation on the processing target image.

5. The image processing apparatus according to claim 4, wherein the one or more processors
acquire a processing target image change command for changing a position of the processing target image, as the processing target image operation command, and
change the position of the processing target image in accordance with the processing target image change command.

6. The image processing apparatus according to claim 4, wherein the one or more processors
acquire a processing target image change command for changing a magnification ratio of the processing target image, as the processing target image operation command, and
change magnification of the processing target image in accordance with the processing target image change command.

7. The image processing apparatus according to claim 1, wherein the one or more processors
acquire a region-of-interest image operation command representing an operation on the region-of-interest image, and
operate the region-of-interest image in accordance with the region-of-interest image operation command, and operate the processing target image in conjunction with the operation on the region-of-interest image.

8. The image processing apparatus according to claim 7, wherein the one or more processors
acquire a region-of-interest image change command for changing a position of the region-of-interest image, as the region-of-interest image operation command, and
change the position of the region-of-interest image in accordance with the region-of-interest image change command.

9. The image processing apparatus according to claim 7, wherein the one or more processors
acquire a region-of-interest image change command for changing a magnification ratio of the region-of-interest image, as the region-of-interest image operation command, and
change magnification of the region-of-interest image in accordance with the region-of-interest image change command.

10. The image processing apparatus according to claim 1, wherein the one or more processors
automatically detect the region-of-interest from the processing target image, generate the region-of-interest image based on the automatically detected region-of-interest in the processing target image, and acquire the generated region-of-interest image.

11. The image processing apparatus according to claim 10, wherein the one or more processors store the processing target image and an automatic detection result of the region-of-interest in association with each other, generate a first learning model that is trained using a set of the processing target image and the automatic detection result of the region-of-interest as learning data, and apply the first learning model to the automatic detection of the region-of-interest.

12. The image processing apparatus according to claim 1, wherein the one or more processors acquire the region-of-interest image generated in advance, based on the region-of-interest detected in advance from the processing target image.

13. The image processing apparatus according to claim 1, wherein the one or more processors receive correction for the region-of-interest, and correct the region-of-interest image based on the correction.

14. The image processing apparatus according to claim 13, wherein the one or more processors store the region-of-interest image and a correction result of the region-of-interest image in association with each other, generate a second learning model that is trained using a set of the region-of-interest image and the correction result of the region-of-interest image as learning data, and apply the second learning model to the automatic detection of the region-of-interest.

15. The image processing apparatus according to claim 1, wherein the one or more processors superimpose and display grids that are linked to each other on the processing target image and the region-of-interest image.

16. The image processing apparatus according to claim 1, wherein the one or more processors receive a position designation operation for designating a position on one of the processing target image or the region-of-interest image, and perform emphasis processing to emphasize a position in the other corresponding to the position designated in the one, in accordance with the position designation operation on the one.

17. The image processing apparatus according to claim 1, wherein the one or more processors receive a position designation operation for designating a position on one of the processing target image or the region-of-interest image, and display a pointer at a position in the other corresponding to the position designated in the one, in accordance with the position designation operation on the one.

18. The image processing apparatus according to claim 1, wherein the one or more processors acquire a type of the region-of-interest, display the type of the region-of-interest on the first region, and display the type of the region-of-interest on the second region or the second display device in association with the type of the region-of-interest displayed on the first region.

19. The image processing apparatus according to claim 1, wherein the one or more processors display the processing target image in grayscale, and display the region-of-interest image in color.

20. The image processing apparatus according to claim 1, wherein the one or more processors switch between a first display mode in which only the processing target image is displayed and a second display mode in which the processing target image and the region-of-interest image are displayed.

21. The image processing apparatus according to claim 1, wherein the one or more processors display the region-of-interest image which has the same shape and the same size as the processing target image.

22. The image processing apparatus according to claim 1, wherein the one or more processors acquire, as the processing target image, an image generated by imaging an industrial product.

23. The image processing apparatus according to claim 1, wherein the one or more processors superimposes, on the region-of-interest image, a grid which is the same as a grid superimposed on the processing target image.

24. A processing system comprising:

an imaging apparatus that images processing target; and one or more processors, wherein the one or more processors acquire a processing target image generated by imaging the processing target, display the processing target image on a first region of a first display device, acquire a region-of-interest image in which a region-of-interest in the processing target is reproduced, display the region-of-interest image on a second region different from the first region of the first display device, or display the region-of-interest image on a second display device different from the first display device, operate one of the processing target image or the region-of-interest image in conjunction with an operation on the other, receive a ruler operation on one of the processing target image or the region-of-interest image, display a ruler operation on the other corresponding to the ruler operation on the one, in accordance with the ruler operation on the one, and in a case where either one of the ruler operation on the processing target image and the ruler operation on the region-of-interest image is interrupted, cause the one of the ruler operation which is interrupted to be taken over as another of the ruler operation.

25. An image display method comprising:

via a computer, acquiring a processing target image generated by imaging a processing target;

displaying the processing target image on a first region of a first display device;

acquiring a region-of-interest image in which a region-of-interest in the processing target is reproduced;

displaying the region-of-interest image on a second region different from the first region of the first display device, or displaying the region-of-interest image on a second display device different from the first display device;

operating one of the processing target image or the region-of-interest image in conjunction with an operation on the other;

receiving a ruler operation on one of the processing target image or the region-of-interest image;

displaying a ruler operation on the other corresponding to the ruler operation on the one, in accordance with the ruler operation on the one; and in a case where either one of the ruler operation on the processing target image and the ruler operation on the region-of-interest image is interrupted, causing the one of the ruler operation which is interrupted to be taken over as another of the ruler operation.

26. A non-transitory, computer-readable tangible recording medium on which a program foe causing, when read by a computer, the computer to execute the image display method according to claim 25 is recorded.

* * * * *